(12) United States Patent
Nishikawa et al.

(10) Patent No.: US 11,528,458 B2
(45) Date of Patent: Dec. 13, 2022

(54) IMAGE DISPLAY APPARATUS AND PROJECTION OPTICAL SYSTEM

(71) Applicant: Sony Group Corporation, Tokyo (JP)

(72) Inventors: Jun Nishikawa, Kanagawa (JP); Naoko Edamitsu, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/298,113

(22) PCT Filed: Nov. 18, 2019

(86) PCT No.: PCT/JP2019/045071
§ 371 (c)(1),
(2) Date: May 28, 2021

(87) PCT Pub. No.: WO2020/116141
PCT Pub. Date: Jun. 11, 2020

(65) Prior Publication Data
US 2022/0046214 A1    Feb. 10, 2022

(30) Foreign Application Priority Data

Dec. 7, 2018 (JP) .............................. JP2018-229588

(51) Int. Cl.
*H04N 9/31* (2006.01)
*G02B 27/09* (2006.01)

(52) U.S. Cl.
CPC ....... *H04N 9/3152* (2013.01); *G02B 27/0955* (2013.01); *G02B 27/0977* (2013.01)

(58) Field of Classification Search
CPC .... G02B 17/04; G02B 17/08; G02B 17/0852; G02B 17/0856; G02B 17/0892;
(Continued)

(56) References Cited

U.S. PATENT DOCUMENTS

2004/0174611 A1    9/2004 Hatakeyama
2004/0233394 A1    11/2004 Gohman
(Continued)

FOREIGN PATENT DOCUMENTS

DE          101 57 605 C1    6/2003
DE    10 2005 029 583 A1    1/2007
(Continued)

OTHER PUBLICATIONS

International Search Report dated Dec. 24, 2019 in PCT/JP2019/045071 filed on Nov. 18, 2019, 2 pages.

*Primary Examiner* — Sultan Chowdhury
(74) *Attorney, Agent, or Firm* — Oblon, McClelland, Maier & Neustadt, L.L.P.

(57) ABSTRACT

An image display apparatus includes a light source, an image generation unit which generates image light, and a projection optical system including a first lens system which refracts the image light, a first reflection optical system having two or more reflection surfaces that fold back and reflect the refracted image light, a second lens system which refracts the image light reflected by the first reflection optical system, and a second reflection optical system which reflects the image light refracted by the second lens system toward a projection object. The first reflection optical system includes an optical component having a principal surface on which one of the reflection surfaces is configured. The principal surface includes a transmission surface that allows the image light to pass therethrough, configured in a region having a shape rotationally asymmetric to the reflection surface with respect to an optical axis of the optical component.

20 Claims, 13 Drawing Sheets

(58) Field of Classification Search
CPC ... G02B 17/16; G02B 27/0955; G02B 27/0961; G02B 27/0966; G02B 27/0977; G02B 27/0983; G02B 27/1026; G03B 21/006; G03B 21/008; G03B 21/16; G03B 21/28; G03B 21/142; G03B 21/145; G03B 21/208; H04N 9/315; H04N 9/3141; H04N 9/3152; H04N 9/3197

See application file for complete search history.

(56) References Cited

U.S. PATENT DOCUMENTS

| | | | |
|---|---|---|---|
| 2005/0174545 A1* | 8/2005 | Lee ................... | G03B 21/147 353/69 |
| 2006/0066760 A1 | 3/2006 | Cho et al. | |
| 2010/0208364 A1 | 8/2010 | Minefuji | |
| 2011/0199692 A1 | 8/2011 | Minefuji | |
| 2017/0332057 A1* | 11/2017 | Matsuo ............... | G03B 21/147 |
| 2018/0246302 A1 | 8/2018 | Minefuji | |
| 2020/0142291 A1* | 5/2020 | Nishikawa ......... | G02B 17/0832 |

FOREIGN PATENT DOCUMENTS

| | | |
|---|---|---|
| EP | 0 633 491 A1 | 1/1995 |
| EP | 3 190 446 A2 | 7/2017 |
| JP | 53-65155 A | 6/1978 |
| JP | 2004-271552 A | 9/2004 |
| JP | 2804-295107 A | 10/2004 |
| JP | 2018-186120 A | 8/2010 |
| JP | 2013-242594 A | 12/2013 |
| JP | 2018-165782 A | 10/2018 |
| WO | WO 2017/033445 A1 | 3/2017 |
| WO | WO 2019/216017 A1 | 11/2019 |

* cited by examiner

| | |
|---|---|
| NA | 0.167 |
| Image modulation element (HxVSp) | 13.4 x 7.6 |
| Image modulation element center position (Chp) | 5.2 |
| Primary image plane   Image circle (imc) | 22.4 |
| Screen size (H x VSs) | 1771 x 996 |
| Screen center position (Chs) | 853 |

| | Curvature radius | thickness | nd | νd | shape | dn/dT |
|---|---|---|---|---|---|---|
| P | ∞ | 1.1 | 1.517 | 64 | | |
| S1 | ∞ | 3.7 | 1.841 | 25 | | |
| S2 | ∞ | 38.4 | | | | |
| S3 | ∞ | 10.9 | | | | |
| S4 | 34.1 | 6.8 | 1.808 | 23 | Positive | -2.6 |
| S5 | -135.8 | 0.3 | | | | |
| S6 | 25.6 | 7.5 | 1.593 | 67 | Positive | -0.8 |
| S7 | -46.1 | 1.9 | 1.805 | 25 | Negative | 1.0 |
| S8 | 19.1 | 5.0 | | | | |
| S9 | 654.7 | 5.7 | 1.593 | 67 | Positive | -0.8 |
| S10 | -15.3 | 1.2 | 1.805 | 25 | Negative | 1.0 |
| S11 | -31.5 | 13.5 | | | | |
| S12 | 222.6 | 2.6 | 1.808 | 23 | Positive | -2.6 |
| S13 | -75.0 | 37.5 | | | | |
| S14 | 28.6 | 6.5 | 1.620 | 36 | Positive | 2.1 |
| S15 | ∞ | 4.0 | 1.620 | 60 | Negative | 2.4 |
| S16 | 50.4 | 10.9 | | | | |
| S17 * | -4.0 | 2.9 | 1.509 | 57 | | |
| S18 * | 4.0 | 32.6 | | | | |
| S19 * | -27.6 | -52.4 | refl | | | |
| S20 | 50.4 | 52.4 | refl | | | |
| S21 * | -27.6 | 3.0 | 1.623 | 58 | | |
| S22 * | -42.1 | 27.0 | | | | |
| S23 | 39.9 | 5.2 | 1.848 | 34 | | |
| S24 | -45.2 | 3.6 | | | | |
| S25 | -27.7 | 1.7 | 1.847 | 24 | | |
| S26 | 103.3 | 3.7 | | | | |
| S27 | 267.6 | 6.1 | 1.593 | 67 | | |
| S28 | -29.4 | 132.5 | | | | |
| S29 * | -41.7 | -470.0 | refl | | | |
| S | ∞ | | | | | |

* ... Aspherical surface

| K | -3.46E+00 | A2 | -5.36E-02 | A3 | 2.02E-02 |
|---|---|---|---|---|---|
| A4: | -1.69E-03 | A5 | -6.61E-05 | A6 | 2.36E-05 |
| A7 | -1.39E-06 | A8 | -3.77E-08 | A9 | 6.53E-09 |
| A10 | -9.38E-11 | A11 | -1.02E-11 | A12 | 3.24E-13 |

S18

| K | -4.52E+00 | A2 | -2.55E-01 | A3 | 6.04E-02 |
|---|---|---|---|---|---|
| A4 | -8.05E-03 | A5 | 5.91E-04 | A6 | -2.13E-05 |
| A7 | 8.13E-07 | A8 | -1.88E-07 | A9 | 2.32E-08 |
| A10 | -1.37E-09 | A11 | 4.02E-11 | A12 | -4.70E-13 |

S19

| K | -1.61E+00 | A3 | -5.59E-04 | A4 | 1.47E-04 |
|---|---|---|---|---|---|
| A5 | -1.61E-05 | A6 | 9.49E-07 | A7 | -2.68E-08 |
| A8 | -2.47E-10 | A9 | 4.03E-11 | A10 | -8.15E-13 |

S21

| K | -1.61E+00 | A3 | -5.59E-04 | A4 | 1.47E-04 |
|---|---|---|---|---|---|
| A5 | -1.61E-05 | A6 | 9.49E-07 | A7 | -2.68E-08 |
| A8 | -2.47E-10 | A9 | 4.03E-11 | A10 | -8.15E-13 |

S22

| A3 | -3.31E-04 | A4 | -1.37E-05 | A5 | 2.16E-06 |
|---|---|---|---|---|---|
| A6 | -7.14E-08 | | | | |

S29

| K | -2.25E+01 | A3 | 2.49E-04 | A4 | -3.94E-05 |
|---|---|---|---|---|---|
| A5 | 9.75E-07 | A6 | -1.46E-10 | A7 | -2.09E-10 |
| A8 | -1.10E-12 | A9 | 6.14E-14 | A10 | 5.34E-16 |
| A11 | -2.25E-17 | A12 | 1.47E-19 | | |

FIG.7

IMAGE DISPLAY APPARATUS AND PROJECTION OPTICAL SYSTEM

TECHNICAL FIELD

The present technology relates to an image display apparatus such as a projector, for example, and a projection optical system.

BACKGROUND ART

Conventionally, a projector has been widely known as a projection-type image display apparatus that displays a projected image on a screen. In recent years, there has been an increasing demand for an ultra-wide-angle front projection projector capable of displaying a large screen even in a small projection space. By using this projector, a large screen can be projected in a limited space by performing projection obliquely at a wide angle with respect to a screen.

In the ultra-wide-angle projection projector described in Patent Literature 1, the screen shift for moving the projected image projected onto the screen can be performed by moving some of optical components included in a projection optical system. Fine adjustment of an image position and the like can be easily performed by using this screen shift (e.g., paragraphs [0023] and [0024] in the specification of Patent Literature 1).

In the projection-type image display apparatus described in Patent Literature 2, a first curved mirror 21 and a second curved mirror 22 are disposed as parts of the projection optical system 1 as shown in FIG. 3 and the like. The second curved mirror 22 is configured on a surface of a reduced side of a tenth lens L1. Projected light passing through the tenth lens L10 is reflected toward the second curved mirror 22 by the first curved mirror 21. The second curved mirror 22 further reflects the reflected light and emits the reflected light toward the screen 10 (paragraphs [0040] and [0043], etc. in the specification of Patent Literature 1).

CITATION LIST

Patent Literature

Patent Literature 1: Japanese Patent No. 5365155
Patent Literature 2: Japanese Patent Application Laid-open No. 2013-242594

DISCLOSURE OF INVENTION

Technical Problem

It is considered that projectors compatible with ultra-wide angles will continue to spread in the future, and a technology for realizing miniaturization and performance enhancement of the apparatus is desired.

In view of the above-mentioned circumstances, it is an object of the present technology to provide an image display apparatus and a projection optical system that are compatible with ultra-wide angles and capable of realizing miniaturization and performance enhancement of the apparatus.

Solution to Problem

In order to accomplish the above-mentioned object, an image display apparatus according to the embodiment of the present technology includes a light source, an image generation unit, and a projection optical system.

The image generation unit modulates light emitted from the light source and generates the image light.

The projection optical system includes a first lens system, a first reflection optical system, a second lens system, and a second reflection optical system.

The first lens system has a positive refractive power as a whole and refracts the generated image light.

The first reflection optical system has two or more reflection surfaces that fold back and reflect the image light refracted by the first lens system.

The second lens system has a positive refractive power as a whole and refracts the image light reflected by the first reflection optical system.

The second reflection optical system has a concave reflection surface that reflects the image light refracted by the second lens system toward a projection object.

The first reflection optical system includes an optical component having a principal surface on which one reflection surface of the two or more reflection surfaces is configured.

The principal surface of the optical component includes a transmission surface that allows the image light to pass therethrough, the transmission surface being configured in a region having a shape rotationally asymmetric to the reflection surface with respect to an optical axis of the optical component and including the optical axis.

In this image display apparatus, the image light refracted by the first lens system is folded back and reflected by each of the two or more reflection surfaces of the first reflection optical system. Accordingly, the optical path length of the image light can be sufficiently secured without increasing the size of the projection optical system. As a result, a reduction in size of the apparatus can be realized. Moreover, the transmission surface is configured in the region having the shape rotationally asymmetric to the reflection surface and including the optical axis on the principal surface of the optical component included in the first reflection optical system. Accordingly, it is possible to improve the assembly accuracy of the projection optical system, and performance enhancement is realized.

The reflection surface of the optical component may include an effective reflection region. In this case, the transmission surface of the optical component may include an effective transmission region that is set in a region having a shape rotationally asymmetric to the effective reflection region with respect to the optical axis of the optical component.

The effective transmission region may include the optical axis.

Provided that a shortest distance between the effective reflection region and the effective transmission region is Lmin, the effective reflection region and the effective transmission region may be each set at a position separated from a boundary between the reflection surface of the optical component and the transmission surface of the optical component by a distance of Lmin/2 or more.

The boundary between the reflection surface of the optical component and the transmission surface of the optical component may be positioned in a middle on a straight line connecting points at which a distance between the effective reflection region and the effective transmission region is shortest.

The reflection surface of the optical component and the transmission surface of the optical component may be configured on the principal surface to be symmetric with respect to a predetermined first axis orthogonal to the optical axis of the optical component.

The projection optical system may be configured such that an optical axis of each of all optical components included in the projection optical system is coincident with a predetermined reference axis. In this case, the image light may be emitted along the reference axis from a position offset from the reference axis in an axis direction of the first axis.

The image display apparatus may further include a holder that includes a mark configured at a predetermined position and holds a circumferential edge of the optical component. In this case, an angle of intersection between a straight line connecting the optical axis of the optical component held by the holder and a center of the mark of the holder and a second axis orthogonal to each of the optical axis of the optical component and the first axis is 5° or less as viewed in an optical axis direction of the optical component.

End portions of the boundary between the reflection surface of the optical component and the transmission surface of the optical component may be positioned on the second axis.

The image display apparatus may further include a holder that includes a mark configured at a predetermined position and holds a circumferential edge of the optical component. In this case, the optical component may include a mark centered on the first axis. Moreover, an angle of intersection between a straight line connecting the optical axis of the optical component held by the holder and a center of the mark of the holder and a straight line connecting the optical axis of the optical component and the center of the mark of the optical component may be 5° or less as viewed in an optical axis direction of the optical component.

The transmission surface of the optical component may be configured, divided into a first region of the principal surface, which includes the optical axis, and a second region different from the first region.

The optical component may include a base portion having light transparency, a transmission film that is laminated on the base portion, and a reflection film that is laminated on the transmission film. In this case, the transmission film may have a surface which is constituted by a layer not including fluorine.

The optical component may have a surface opposite to the principal surface. In this case, the opposite surface may include a region including the optical axis of the optical component and configured as the transmission surface.

The projection optical system may be configured such that the optical axis of each of all optical components included in the projection optical system is coincident with a predetermined reference axis.

The predetermined reference axis may be an axis obtained by extending an optical axis of a lens disposed at a position closest to the image generation unit included in the first lens system.

The optical axis of the optical component may be positioned at a center of the principal surface of the optical component.

The transmission surface of the optical component may function as the first lens system.

The transmission surface of the optical component may function as the second lens system.

The optical component may have a circular outer shape as viewed in an optical axis direction of the optical component.

A projection optical system according to an embodiment of the present technology is a projection optical system that projects image light generated by modulating light emitted from a light source. The projection optical system includes the first lens system, the first reflection optical system, the second lens system, and the second reflection optical system.

BRIEF DESCRIPTION OF DRAWINGS

FIG. 6 Lens data of the image display apparatus.

FIG. 7 A table showing an example of aspheric coefficients of optical components included in the projection optical system.

MODE(S) FOR CARRYING OUT THE INVENTION

Hereinafter, embodiments according to the present technology will be described with reference to the drawings.

[Outline of Projection-Type Image Display Apparatus]

The outline of a projection-type image display apparatus will be briefly described by exemplifying a liquid-crystal projector. The liquid-crystal projector spatially modulates light emitted from a light source to thereby form an optical image (image light) corresponding to a video signal. A liquid-crystal display element or the like that is an image modulation element is used for light modulation. For example, a three-plate liquid-crystal projector including a panel-shaped liquid-crystal display element (liquid-crystal panel) corresponding to each of RGB is used.

The optical image is magnified and projected by a projection optical system and displayed on a screen. Here, the description will be given assuming that the projection optical system is compatible with ultra-wide angles in which the half angle of view is about 70°, for example. As a matter of course, the present technology is not limited to such an angle.

In the liquid-crystal projector compatible with ultra-wide angles, a large screen can be displayed even in a small projection space. That is, the magnification and projection can be performed even if the distance between the liquid-crystal projector and the screen is short. Accordingly, the following advantages are exhibited.

The liquid-crystal projector can be disposed close to the screen, and thus the possibility that light from the liquid-crystal projector may directly enter the human eye can be sufficiently lowered, and a higher degree of safety is provided. Since shadows of a person and the like do not fall on the screen, efficient presentation can be performed. The degree of freedom in selecting the installation site is high, and easy installation can be performed even in a narrow installation space, a ceiling with many obstacles, and the like. The use of the liquid-crystal projector installed on the wall makes it easy to perform maintenance such as routing of a cable as compared to a case where the liquid-crystal projector is installed on the ceiling. For example, it is possible to increase the degree of freedom in setting a meeting space, a classroom, a conference room, and the like.

Figure 1:
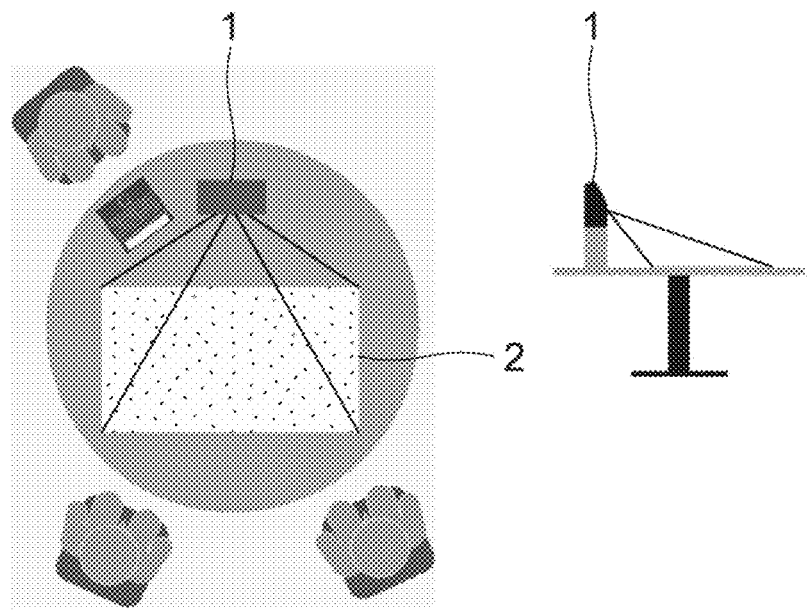
FIG. 1 A schematic diagram for describing other advantages of a liquid-crystal projector compatible with ultra-wide angles.

FIG. 1 is a schematic diagram for describing other advantages of the liquid-crystal projector compatible with ultra-wide angles. By installing a liquid-crystal projector 1 compatible with ultra-wide angles on a table, a magnified image 2 can be projected onto the same table as shown in FIG. 1. Such use is also possible, and the space can be efficiently used.

In recent years, there has been an increasing demand for the liquid-crystal projector compatible with ultra-wide angles with the widespread use of electronic blackboards (interactive white board) and the like in schools, workplaces, and the like. Moreover, a similar liquid-crystal projector is also used in the fields of digital signage (electronic advertising) and the like. It should be noted that for example, a technology such as a liquid crystal display (LCD) and a plasma display panel (PDP) can be used as the electronic blackboard. As compared to them, a large screen can be provided with reduced costs by using the liquid-crystal projector compatible with ultra-wide angles. It should be noted that the liquid-crystal projector compatible with ultra-wide angles is also called short focus projector, ultra-short focus projector, or the like.

First Embodiment

[Image Display Apparatus]

Figure 2:
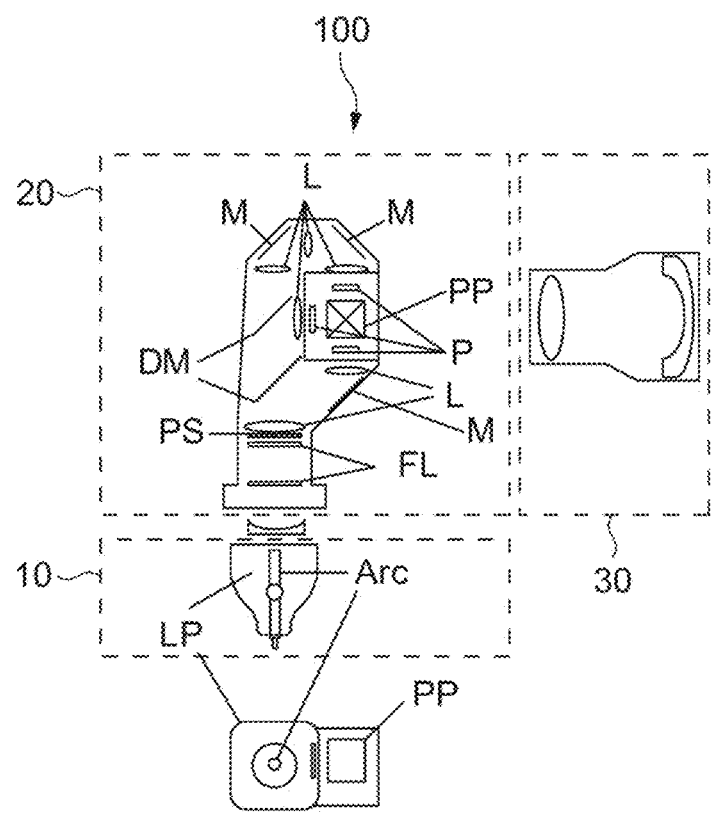
FIG. 2 A schematic diagram showing a configuration example of a projection-type image display apparatus according to a first embodiment.

FIG. 2 is a schematic diagram showing a configuration example of a projection-type image display apparatus according to a first embodiment of the present technology.

An image display apparatus 100 includes a light source 10, a lighting optical system 20, and a projection optical system 30.

The light source 10 is disposed to emit a light flux to the lighting optical system 20. For example, a high-pressure mercury lamp or the like is used as the light source 10. Alternatively, a solid-state light source such as a light-emitting diode (LED) and a laser diode (LD) may be used.

The lighting optical system 20 uniformly emits the light flux emitted from the light source 10 onto a surface of an image modulation element (liquid-crystal panel P) that is a primary image plane. In the lighting optical system 20, the light flux from the light source 10 passes through two fly-eye lenses FL, a polarization conversion element PS, and a condenser lens L in the stated order, and is converted into a uniform light flux in which light is uniformly polarized.

The light flux passing through the condenser lens L is separated into light of respective RGB color components by a dichroic mirror DM that reflects only light in a particular wavelength band. The light of the respective RGB color components enters the liquid-crystal panel P (image modulation element) provided corresponding to the respective RGB colors via a total reflection mirror M, the lens L, and the like. Then, light modulation according to the video signal is performed by each liquid-crystal panel P. The modulated light beams of the respective color components are combined by a dichroic prism PP, and image light constituting an image is generated. The generated image light is emitted toward the projection optical system 30.

The optical component or the like constituting the lighting optical system 20 is not limited, and an optical component different from the optical components described above may be used. For example, a reflective liquid-crystal panel, a digital micromirror device (DMD), or the like may be used as the image modulation element instead of the transmissive liquid-crystal panel P. Moreover, for example, a polarizing beam splitter (PBS), a color combination prism that combines video signals of RGB colors, a total internal reflection (TIR) prism, or the like may be used instead of the dichroic prism PP. In this embodiment, the lighting optical system 20 functions as an image generation unit that generates image light by modulating the light emitted from the light source.

The projection optical system 30 adjusts the image light emitted from the lighting optical system 20 and magnifies and projects the image light onto a screen that is a secondary image plane. That is, the projection optical system 30 adjusts image information of the primary image plane (liquid-crystal panel P) and magnifies and projects it onto the secondary image plane (screen).

In this embodiment, the screen corresponds to a projection object and a portion of the screen on which the image is projected corresponds to a planar portion of the projection object. In addition, the present technology is not limited to the projection object is not limited, and the present technology can be applied to display of an image on an arbitrary projection object such as the table as shown in FIG. 1 and a wall of a building or the like.

Figure 3:
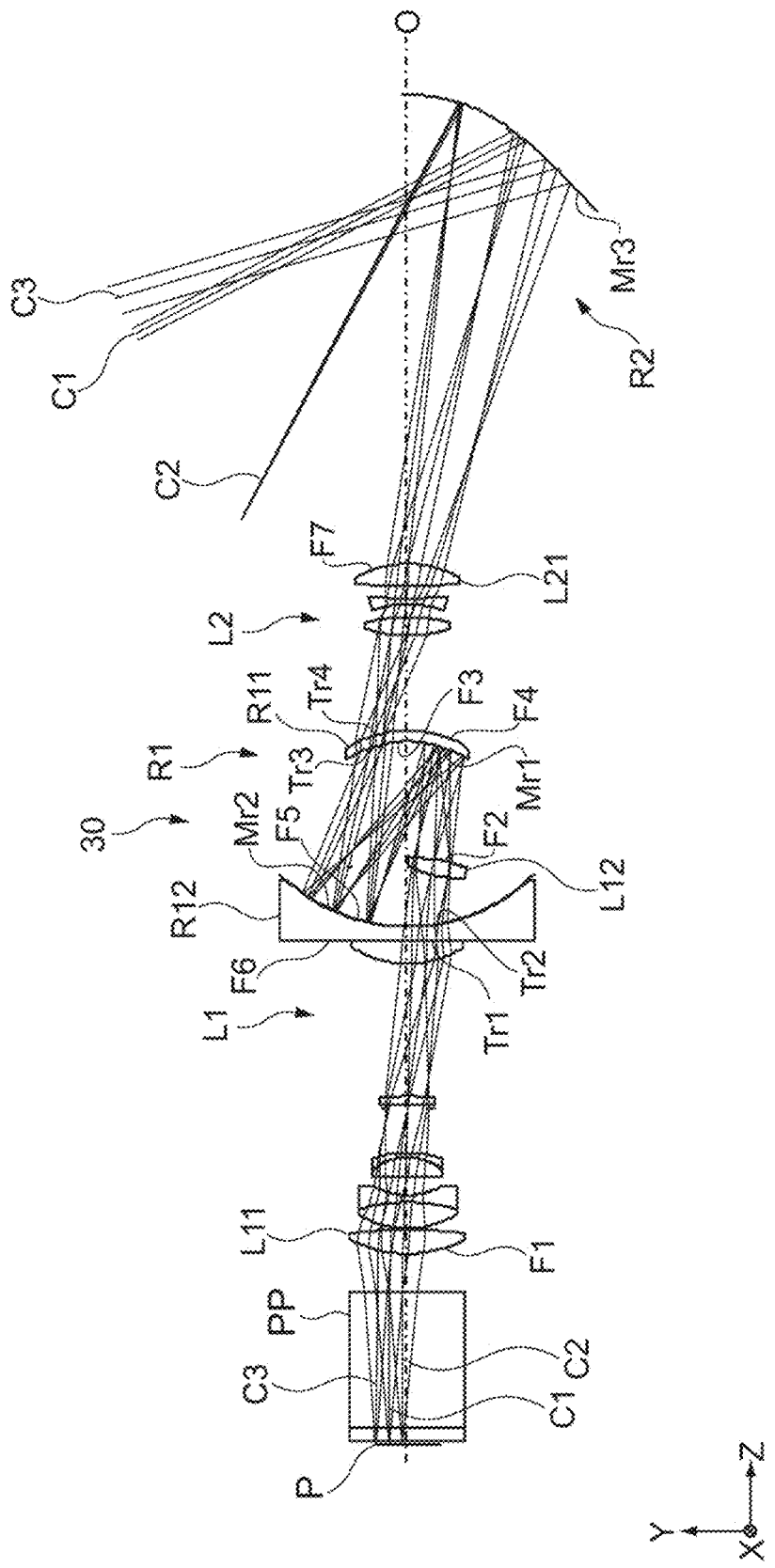
FIG. 3 An optical path diagram showing a schematic configuration example of a projection optical system according to the first embodiment.

FIG. 3 is an optical path diagram showing a schematic configuration example of the projection optical system according to this embodiment. Here, the liquid-crystal panel P and the dichroic prism PP of the lighting optical system 20 are schematically shown.

Hereinafter, it is assumed that an emission direction of the image light emitted from the dichroic prism PP to the projection optical system is a Z-direction. Moreover, a lateral direction of the primary image plane (liquid-crystal panel P) is an X direction and a longitudinal direction is a Y-direction. The X direction and the Y-direction are directions corresponding to the lateral direction and the longitudinal direction of an image to be magnified and projected onto the secondary image plane (screen).

Moreover, for the sake of convenience, the description is made by using the Z-direction in the figure as a right-and-left direction and the Y-direction as a up-and-down direction in some cases assuming that the projection optical system is viewed from the side. As a matter of course, a traveling direction of the image light is not limited to this direction, and the traveling direction of the image light is determined in accordance with the direction, attitude, and the like of the image display apparatus 100.

The projection optical system 30 includes a first lens system L1, a first reflective optical system R1, a second lens system L2, and a second reflective optical system R2. The first lens system L1 has a positive refractive power as a whole and refracts the image light generated by the lighting optical system 20.

In this embodiment, a portion from an incident surface F1 that image light of a lens L11 disposed at a position closest to the lighting optical system 20 enters to an emission surface F2 from which image light of a lens L12 (hereinafter, referred to as nearest lens L12) disposed at a position closest to a first reflection surface Mr1 is emitted function as the first lens system L1.

As shown in FIG. 3, the first lens system L1 is configured with reference to a reference axis extending in the Z-direction (hereinafter, this reference axis will be referred to as optical axis O). Specifically, the first lens system L1 is configured such that the optical axis of each of one or more optical components included in the first lens system L1 is coincident with the optical axis O that is the reference axis.

The optical axis of the optical component is typically an axis extending through the center of an optical surface such as a lens surface and a reflection surface of the optical component. For example, in a case where the optical surface of the optical component has a rotationally symmetric axis, the rotationally symmetric axis corresponds to the optical axis. It should be noted that like the nearest lens L12, only a portion of an optical component disposed such that its own optical axis is coincident with the optical axis O may be used, the portion including an effective region that is a region that the image light enters. Miniaturization of the projection optical system 30 can be realized by using a portion of the optical component.

In this embodiment, the optical axis O is an axis obtained by extending the optical axis (rotationally symmetric axis) of the lens L11 disposed at a position closest to the lighting optical system 20, which is included in the first lens system L1. That is, another optical component is disposed on the axis obtained by extending the optical axis of the lens L11.

It should be noted that the image light is emitted along the optical axis O from a position offset from the optical axis O in a perpendicular direction (up-and-down direction). In this embodiment, the direction along the optical axis O can also be referred to as a traveling direction of the optical path of the first lens system L1.

A first reflection optical system R1 includes the first reflection surface Mr1 and a second reflection surface Mr2 as two or more reflection surfaces that fold back and reflect the image light refracted by the first lens system L1. In this embodiment, the two reflection surfaces function as the first reflective optical system R1.

The first reflection surface Mr1 is disposed below the optical axis O and folds back and reflects the image light refracted by the first lens system L1. Specifically, the image light entering from the left side is folded back and reflected to the upper left side.

In this embodiment, a first optical component R11 is disposed such that the rotationally symmetric axis is coincident with the optical axis O. The first optical component R11 has rotationally symmetric aspherical surfaces F3 and F4. The first reflection surface Mr1 is formed to include a region in the aspherical surface F3 of the first optical component R11, which the image light emitted from the first lens system L1 enters.

The second reflection surface Mr2 is disposed above the optical axis O, and folds back the image light reflected by the first reflection surface Mr1 and reflects the image light toward the second lens system L2. Specifically, the image light entering from the lower right side is folded back and reflected to the right side.

In this embodiment, a second optical component R12 is disposed such that the rotationally symmetric axis is coincident with the optical axis O. The second optical component R12 has a rotationally symmetric plane F5 and a plane F6. The second reflection surface Mr2 is formed to include a region in the rotationally symmetric surface F5 of the second optical component R12, which the image light reflected by the first reflection surface Mr1 enters.

It should be noted that as shown in FIG. 3, transmission surfaces Tr1 and Tr2 that allow the image light emitted from the lens L11 side to pass therethrough are respectively formed in the rotationally symmetric surface F5 and the plane F6 of the second optical component R12. The transmission surfaces Tr1 and Tr2 are formed in a region different from the second reflection surface Mr2 of the second optical component R12. The transmission surfaces Tr1 and Tr2 function as the first lens system L1.

As described above, optical surfaces (transmission surfaces Tr1 and Tr2) that function as the first lens system L1 and an optical surface (second reflection surface Mr2) that functions as the first reflective optical system R1 may be realized by one optical component. Accordingly, it is possible to realize miniaturization of the projection optical system 30. It is also possible to improve the assembly accuracy of the projection optical system 30 by using the second optical component R12 having a rotationally symmetric axis.

Also regarding the first optical component R11, transmission surfaces Tr3 and Tr4 that allow the image light reflected by the second reflection surface Mr2 to pass therethrough are similarly respectively formed in the aspherical surfaces F3 and F4. The transmission surfaces Tr3 and Tr4 are formed in a region different from the first reflection surface Mr of the first optical component R1l. The transmission surfaces Tr3 and Tr4 function as the second lens system L2.

Since the optical surfaces of the different optical systems are each realized by one optical component as describe above, it is possible to realize miniaturization of the projection optical system 30. It is also possible to improve the assembly accuracy of the projection optical system 30.

The second lens system L2 has a positive refractive index as a whole and refracts the image light reflected by the first reflective optical system R1, i.e., the image light reflected by the second reflection surface Mr2. In this embodiment, a portion from the transmission surface Tr3 formed on the first optical component R11 to an emission surface F7 from which image light of a lens L21 disposed at a position closest to the second reflective optical system R2 is emitted functions as the second lens system L2.

The second lens system L2 is configured with reference to the optical axis O. Specifically, the second lens system L2 is configured such that the optical axis of each of the one or more optical components included in the second lens system L2 is coincident with the optical axis O that is the reference axis.

The second reflective optical system R2 has a concave reflection surface Mr3. In this embodiment, this concave reflection surface Mr3 functions as the second reflective optical system R2.

The concave reflection surface Mr3 reflects the image light refracted by the second lens system L2 toward the screen. The concave reflection surface Mr3 is a rotationally symmetric aspherical surface configured such that the rotationally symmetric axis is coincident with the optical axis O, and is constituted by only a portion including an effective region that is a region that image light enters. That is, only a necessary portion of the rotationally symmetric aspheric surface is disposed rather than disposing the entire rotationally symmetric aspheric surface. Accordingly, it is possible to realize miniaturization of the apparatus.

As shown in FIG. 3, in this embodiment, the first lens system L1, the first reflective optical system R1, the second lens system L2, and the second reflective optical system R2 are configured on the common optical axis O. That is, the first lens system L1, the first and second reflection surfaces Mr1 and Mr2, the second lens system L2, and the concave reflection surface Mr3 are configured such that the axis obtained by extending the optical axis (rotationally symmetric axis) of the lens L1$i$ disposed at the position closest to the lighting optical system 20 is coincident with each optical axis (rotationally symmetric axis). Accordingly, it is possible to reduce the size in the Y-direction and realize miniaturization of the apparatus.

As described above, the entire projection optical system 30 may be configured with reference to the optical axis O. That is, each of the optical axes of all of the optical components included in the projection optical system 30 may be configured to be coincident with the optical axis O that is the reference axis. As a matter of course, the present technology is not limited thereto, and an optical component whose optical axis is offset from the optical axis O may be included in the projection optical system 30.

The optical path of the image light will be described with reference to FIG. 3. In FIG. 3, optical paths of three pixel light beams C1, C2, and C3 of the image light emitted from the dichroic prism PP to the projection optical system 30 are shown.

As will be described later with reference to FIG. 5, the pixel light beam C1 corresponds to a pixel light beam emitted from a pixel at the center of the liquid-crystal panel P. Hereinafter, the pixel light beam C1 will be referred to as a main light beam C1 in some cases. The pixel light beam C2 corresponds to a pixel light beam emitted from a pixel closest to the optical axis O at the center of the liquid-crystal panel P. The pixel light beam C3 corresponds to a pixel light beam emitted from a pixel furthest from the optical axis O at the center of the liquid-crystal panel P.

That is, in this embodiment, the pixel light beam C2 corresponds to the pixel light beam emitted from the pixel closest to the optical axis O of the liquid-crystal panel P. Moreover, the pixel light beam C3 corresponds to the pixel light beam emitted from the pixel furthest from the optical axis O, which is located on a straight line connecting the pixel closest to the optical axis O to the pixel at the center of the liquid-crystal panel P.

The image light emitted to the projection optical system 30 along the optical axis O from a position offset upward from the optical axis O intersects with the optical axis O in the first lens system L1 and travels downward. Then, the image light emitted from the first lens system L1 is folded back to the upper left side by the first reflection surface Mr1 and intersects with the optical axis O again.

The image light folded back to the upper left side is folded back by the second reflection surface Mr2 and is reflected toward the second lens system L2. Then, the image light intersects with the optical axis O again and travels to the lower right side. The image light traveling to the lower right side is reflected by the concave reflection surface Mr3, intersects with the optical axis O again, and travels toward the screen.

As described above, in this embodiment, the optical path of the image light is configured such that the main light beam C1 intersects with the optical axis O four times. Accordingly, the optical path of the image light to the concave reflection surface Mr3 can be configured in the vicinity of the optical axis O. As a result, it is possible to reduce the size of the projection optical system 30 in the Y-direction, and it is possible to realize miniaturization of the apparatus.

Moreover, the image light is folded back and reflected by each of the first and second reflection surfaces Mr1 and Mr2. Accordingly, the optical path length of image light can be sufficiently secured. As a result, it is possible to reduce the size of the apparatus in the X direction, and realize miniaturization of the apparatus.

Moreover, in the projection optical system 30 according to this embodiment, a plurality of intermediate images (not shown) is formed between the dichroic prism PP and the concave reflection surface Mr3 included in the lighting optical system 20. The intermediate image is an intermediate image of an image formed by image light. Accordingly, image light can be projected at an ultra-wide angle. For example, a large screen can be displayed even if the distance between the projector and the screen is short.

In order to form a high-precision image on a planar screen by the concave reflection surface Mr3, it is important to optically properly correct the image generated by the lighting optical system 20 and guide it to the concave reflection surface Mr3. In this embodiment, since the optical path length of image light can be sufficiently secured by the first and second reflection surfaces Mr1 and Mr2, it is possible to accurately perform optical correction of an image. That is, an appropriate intermediate image can be generated, and a high-precision image can be easily formed on a screen.

Moreover, since the optical path length is sufficiently secured, it is possible to reduce the optical load required to generate an appropriate intermediate image, and it is possible to reduce the optical power of each of the optical components included in the projection optical system 30. As a result, it is possible to realize miniaturization of each optical component, and it is possible to realize miniaturization of the entire apparatus.

Moreover, since a plurality of intermediate images is formed inside the projection optical system 30, an optimal intermediate image can be generated with high accuracy. As a result, it is possible to display a high-precision image on the screen by the concave reflection surface Mr3. By using the projection optical system 30 according to this embodiment as described above, it is possible to realize performance enhancement of the apparatus.

Figures 4, 5:
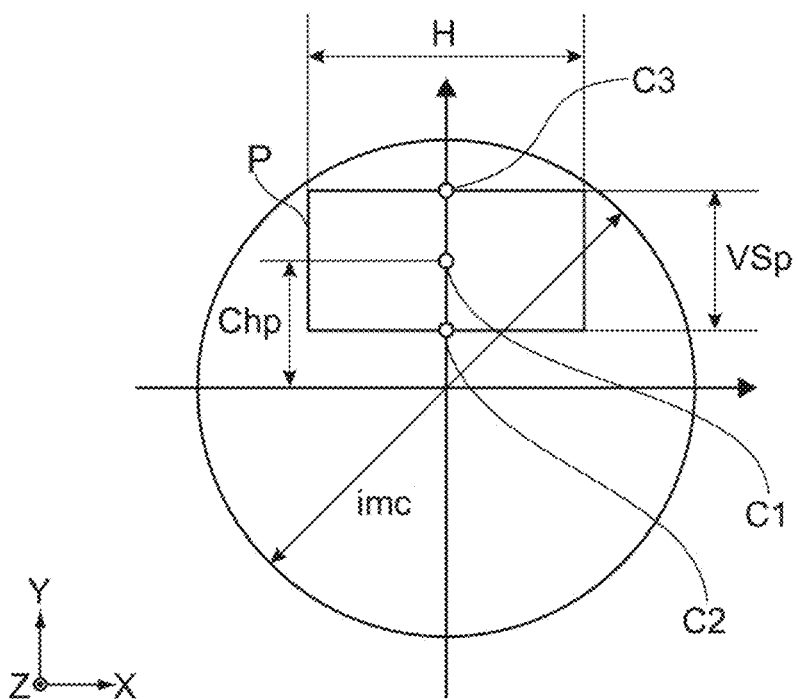
FIG. 4 A table showing an example of parameters related to image projection.
FIG. 5 A schematic view for describing the parameters shown in FIG. 4.

FIG. 4 is a table showing an example of parameters related to image projection. FIG. 5 is a schematic diagram for describing the parameters shown in FIG. 4.

The numerical aperture NA of the projection optical system 30 on the side of the primary image plane is 0.167. The lengths (H×VSp) of the image modulation element (liquid-crystal panel P) in the lateral direction and the longitudinal direction are 13.4 mm and 7.6 mm, respectively. The central position (Chp) of the image modulation element is a position of 5.2 mm above the optical axis O. The image circle (imc) on the side of the primary image plane is $22.4 mm.

The lengths (H×VSs) of the screen in the lateral direction and the longitudinal direction are 1,771 mm and 996 mm, respectively. The central position (Chs) of the screen size is a position of 853 mm above the optical axis O.

As described above, the light emitted from the pixel at the center of the liquid-crystal panel P shown in FIG. 5 corresponds to the pixel light beam C1 shown in FIG. 3 (denoted by the same reference sign). The light emitted from the pixel closest to the optical axis O at the center of the liquid-crystal panel P corresponds to the pixel light beam C2 (denoted by the same reference sign). The light emitted from the pixel furthest from the optical axis O at the center of the liquid-crystal panel P corresponds to the pixel light beam C3 (denoted by the same reference sign).

FIG. 6 shows lens data of the image display apparatus. In FIG. 6, data about the optical components (lens surface) of S1 to S29 arranged from the primary image plane (P) side to the secondary image plane (S) side is shown. A curvature radius (mm), a core thickness d (mm), and a refractive index nd in a d-line (587.56 nm), and an Abbe number vd in the d-line are described as the data about each of the optical components (lens surfaces).

Moreover, in FIG. 6, optical components having a positive refractive power and optical components having a negative refractive power in the first lens system L1, which are each made of a material different from a plastic material, are shown in a distinguishable manner. Moreover, the refractive index temperature coefficient dn/dt of each of these optical members is shown.

It should be noted that in this embodiment, only the nearest lens L12 of the first lens system L1, which is disposed in the immediate vicinity of the first reflection surface Mr1, is made of plastic. Then, other optical components are made of glass. Therefore, all the optical components included in the first lens system L1 other than the nearest lens L12 are made of a material different from plastic. As a matter of course, the present technology is not limited to such a configuration, and the optical components other than the nearest lens L12 may be made of plastic.

It should be noted that the optical component having the aspherical surface follows the following formula.

$$Z = \frac{ch^2}{1 + \{1 - (1+K)c^2h^2\}^{1/2}} + \sum_{i=1}^{} Aih^i \quad \text{[Expression 1]}$$

FIG. 7 is a table showing an example of aspheric coefficients of optical components included in the projection optical system. FIG. 7 shows aspheric coefficients for aspherical surfaces S17 to S19, S21, S22, and S29 to which the * marks are added in FIG. 6. The aspheric coefficients in the shown example correspond to the above formula (Expression 1).

[First and Second Optical Components]

Figure 8:
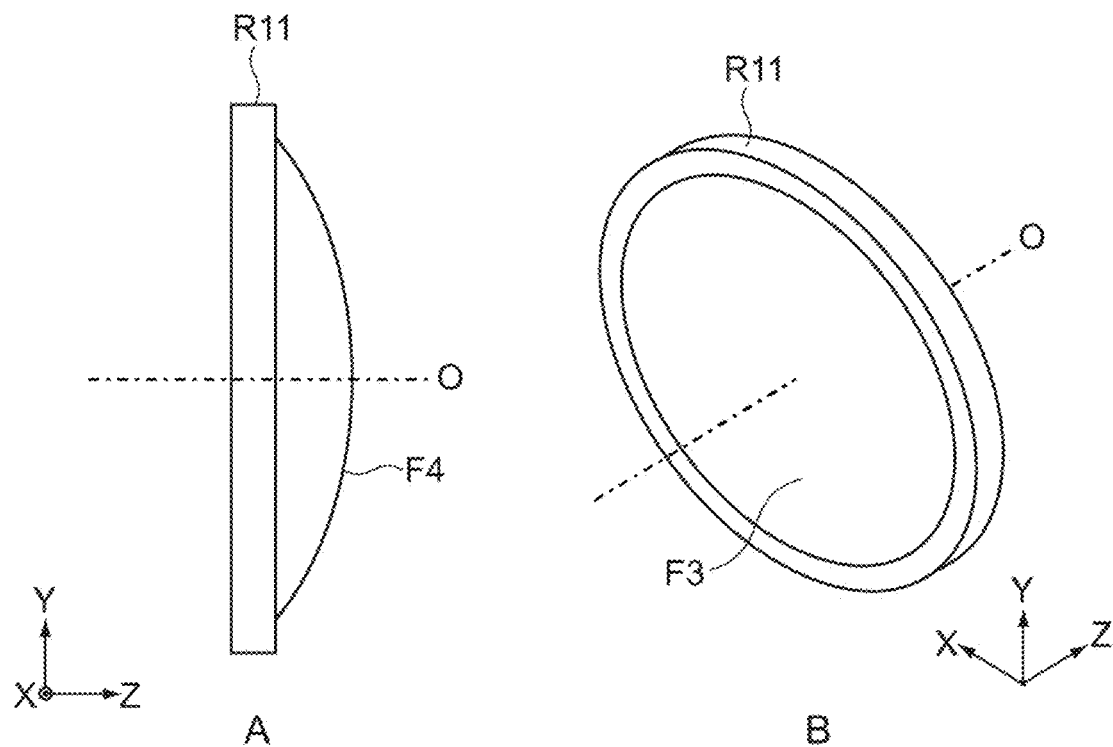
FIG. 8 A schematic perspective view showing a configuration example of a first optical component.
Figure 9:
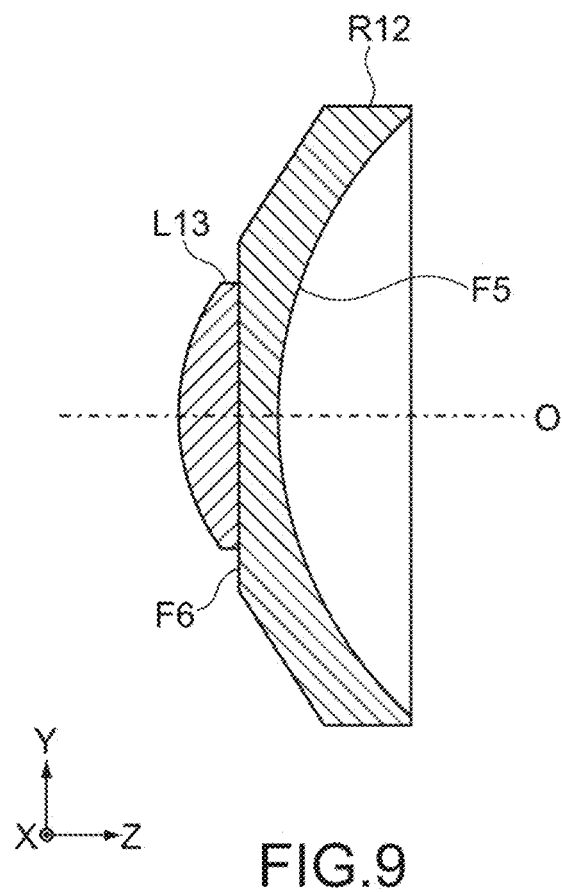
FIG. 9 A schematic cross-sectional view showing a configuration example of a second optical component.

FIG. 8 is a schematic perspective view showing a configuration example of the first optical component R11. FIG. 9 is a schematic cross-sectional view showing a configuration example of the second optical component R12. FIG. 9 also shows an optical component L13 disposed on the previous stage side of the second optical component R12 (on the lighting optical system 20 side). The first optical component R11 and the second optical component R12 are an embodiment of the optical component according to the present technology.

As shown in FIGS. 8A and B, the first optical component R11 has the aspherical surfaces F3 and F4. The aspherical surface F3 corresponds to the lens surfaces S19 and S21 in the lens data of FIG. 6. The aspherical surface F4 corresponds to the lens surface S22 in the lens data of FIG. 6.

As shown in FIG. 9, the second optical component R12 has the rotationally symmetric plane F5 and the plane F6. The rotationally symmetric plane F5 corresponds to the lens surfaces S16 and S20 in the lens data of FIG. 6. The plane F6 corresponds to the lens surface S15 in the lens data of FIG. 6.

The optical axis O that is the reference axis is coincident with the optical axis of the first optical component R11. Moreover, the optical axis O is coincident with the optical axis of the second optical component R12.

It should be noted that the second optical component R12 and the optical component L13 are integrally configured. The second optical component R12 and the optical component L13 as a whole can also be considered as the optical component according to the present technology. Moreover, the shape of the second optical component R12 illustrated in FIG. 9 is slightly different from that of the second optical component R12 illustrated in FIG. 3. Many variations can be employed as a configuration example of the second optical component R12.

As shown in FIGS. 8A and B, the outer shape of the first optical component R11 is a circular shape as viewed in the axial direction of the optical axis O that is the reference axis (the optical axis direction of the first optical component R11). Although a cross-sectional view is shown in FIG. 9, the outer shape of the second optical component R12 is also a circular shape as viewed in the axial direction of the optical axis O that is the reference axis (the optical axis direction of the second optical component R12). It should be noted that in the present disclosure, the circular shape includes not only a true circular shape but also an elliptical shape and the like.

By employing the circular shapes as the outer shapes of the first optical component R11 and the second optical component R12 as described above, those can be easily incorporated into the lens barrel whose inner diameter is a cylindrical shape. Moreover, it is possible to avoid eccentricity due to backlash by reducing each of a difference between a lens outer shape dimension and a lens barrel inner diameter dimension of the first optical component R11 and a difference between a lens outer shape dimension and a lens barrel inner diameter dimension of the second optical component R12. As a result, it is possible to omit an adjustment mechanism even for the optical component having the reflection surface.

Hereinafter, the aspherical surface F3 of the first optical component R12 will be referred to as a principal surface F3 of the first optical component R11 using the same reference sign. The rotationally symmetric plane F5 of the second optical component R12 will be referred to as a principal surface F5 of the second optical component R12 using the same reference sign.

The principal surface F3 of the first optical component R11 is a surface on which the first reflection surface Mr1 and the transmission surface Tr3 are configured. The principal surface F5 of the second optical component R12 is a surface on which the second reflection surface Mr2 and the transmission surface Tr2 are configured.

Figure 10:
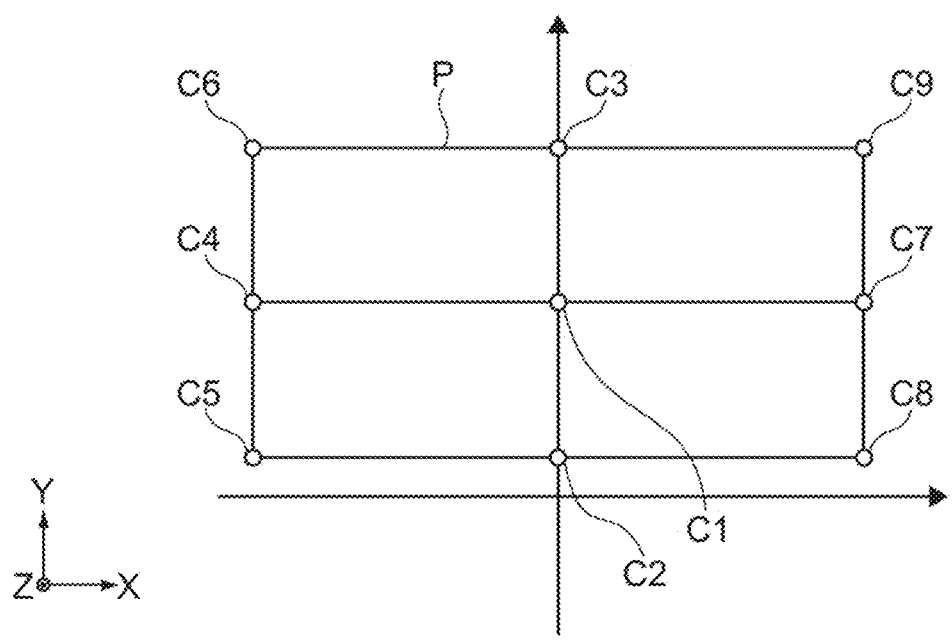
FIG. 10 A diagram for describing a pixel light beam emitted from a liquid-crystal panel.

FIG. 10 is a diagram for describing the pixel light beam emitted from the liquid-crystal panel P. As shown in FIG. 10, the image light beams C1 to C9 are defined as follows.

Figure 11:
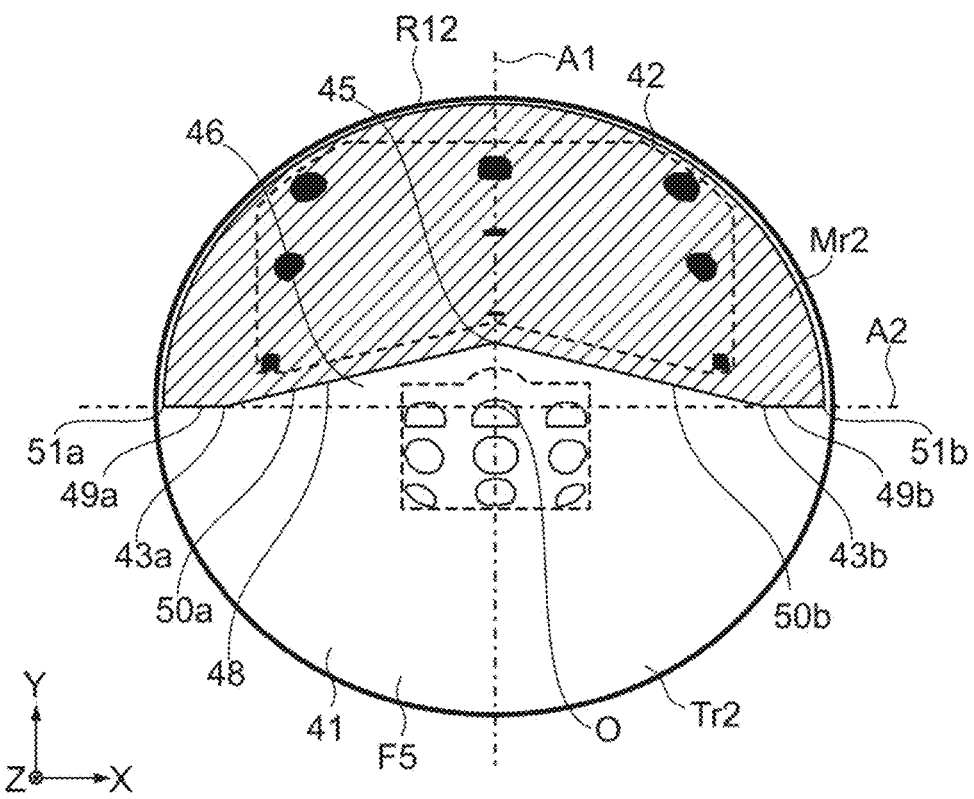
FIG. 11 A schematic view showing a configuration example of a principal surface of the second optical component.

Image light beam C1 . . . Pixel light beam emitted from the pixel at the center of the liquid-crystal panel P Image light beam C2 . . . Pixel light beam emitted from the pixel closest to the optical axis O in the center of the liquid-crystal panel P Image light beam C3 . . . Pixel light beam emitted from the pixel furthest from the optical axis O in the center of the liquid-crystal panel P Image light beam C4 . . . Pixel light beam emitted from the pixel at the center of the left end of the liquid-crystal panel P Image light beam C5 . . . Pixel light beam emitted from the pixel at the lower left end of the liquid-crystal panel P Image light beam C6 . . . Pixel light beam emitted from the pixel at the upper left end of the liquid-crystal panel P Image light beam C7 . . . Pixel light beam emitted from the pixel at the center of the right end of the liquid-crystal panel P Image light beam C8 . . . Pixel light beam emitted from the pixel at the lower right end of the liquid-crystal panel P Image light beam C9 . . . Pixel light beam emitted from the pixel at the upper right end of the liquid-crystal panel P FIG. 11 is a schematic diagram showing a configuration example of the principal surface F5 of the second optical component R12. FIG. 11 is a diagram as the principal surface F5 is viewed from the front along the optical axis O that is the reference axis. The optical axis O is located at the center of the principal surface F5.

An axis extending in the up-and-down direction (Y direction) from the position (center position) of the optical axis O as the principal surface F5 is viewed from the front is defined as a first axis A1. Moreover, an axis extending from the position of the optical axis O (center position) in a left-and-right direction (X direction) is defined as a second axis A2.

Each of the first axis A1 and the second axis A2 is an axis orthogonal to the optical axis O. Moreover, the first axis A1 is an axis orthogonal to each of the optical axis O and the second axis A2. Moreover, the second axis A2 is an axis orthogonal to each of the optical axis O and the first axis A1.

As shown in FIG. 3, the image light is emitted along the optical axis O from a position offset from the optical axis O in the up-and-down direction (Y direction). Therefore, it can also be said that the first axis A1 is an axis extending in the offset direction of the position at which the image light is emitted with respect to the optical axis O. Moreover, conversely, it can also be said that the image light is emitted along the optical axis O from the position offset from the optical axis O in the axial direction of the first axis A1.

As shown in FIG. 11, the second reflection surface Mr2 that reflects the image light and the transmission surface Tr2 that allows the image light to pass therethrough are configured on the principal surface F5. The second reflection surface Mr2 is one reflection surface of the two or more reflection surfaces of the first reflection optical system R1. The transmission surface Tr2 is a surface that functions as the first lens system L1.

The second reflection surface Mr2 and the transmission surface Tr2 are formed to be rotationally asymmetric with respect to the optical axis O. Moreover, the transmission surface Tr2 is formed to include the optical axis O. That is, the transmission surface Tr2 is configured in a region including the optical axis O, which has the shape rotationally asymmetric to the second reflection surface Mr3 with respect to the optical axis O. Including the optical axis O means including the position of the optical axis O on the principal surface F5. In this embodiment, the transmission surface Tr2 is configured to include the center of the principal surface F5.

In this embodiment, a lower half region 41 and a part of an upper half region 42 of the two regions obtained by dividing the principal surface F5 in the up-and-down direction by the second axis A2 are configured as the transmission surface Tr2. The part of the upper half region 42 is a triangular region 46 connecting two points 43a and 43b on the second axis A2, which are symmetric with respect to the center (position of the optical axis O), and a point 45 located above the center on the second axis A2. The triangular region 46 is connected to the lower half region 41 and the transmission surface Tr2 is configured in these regions.

The second reflection surface Mr2 is configured in a region excluding the triangular region 46 from the upper half region 42. Accordingly, the second reflection surface Mr2 and the transmission surface Tr2 to be rotationally asymmetric to each other with respect to the optical axis O are configured. Moreover, the transmission surface Tr2 is configured to include the optical axis O.

The triangular region 46 is symmetric with respect to the first axis A1. Therefore, the second reflection surface Mr2 and the transmission surface Tr2 are configured on the principal surface F5 to be symmetric with respect to the first axis A1 orthogonal to the optical axis O.

As shown in FIG. 11, a boundary 48 between the second reflection surface Mr2 and the transmission surface Tr2 is constituted by linear portions 49a and 49b extending along the second axis A2, a linear portion 50a connecting the points 43a and 45, and a linear portion 50b connecting the points 43b and 45. Moreover, both end portions 51a and 51b of the boundary 48 between the second reflection surface Mr2 and the transmission surface Tr2 are located on the second axis A2.

Figure 12:
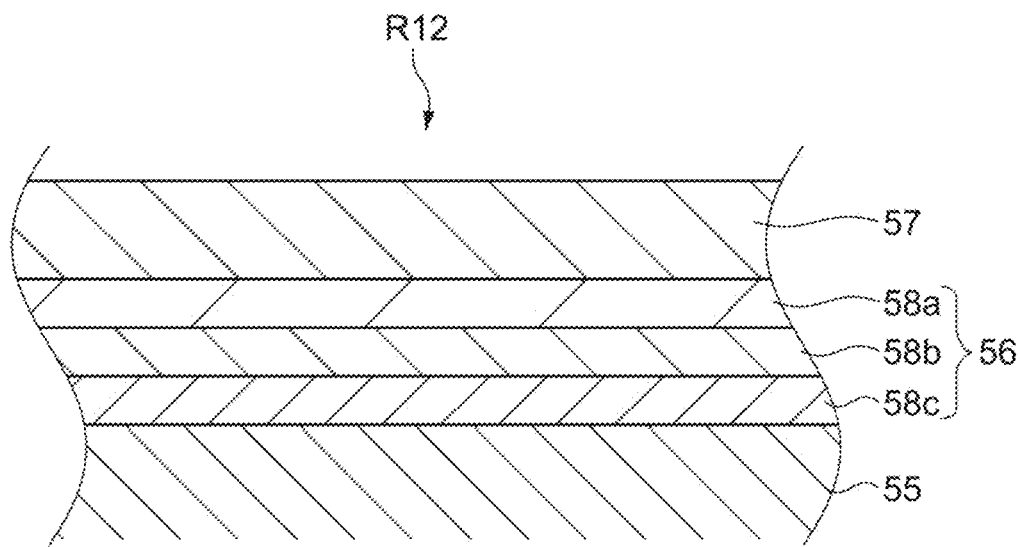
FIG. 12 A schematic cross-sectional view for describing an example of a method of forming a second reflection surface and a transmission surface.

FIG. 12 is a schematic cross-sectional view for describing an example of the method of forming the second reflection surface Mr2 and the transmission surface Tr2. For example, a base portion 55 having the outer shape of the second optical component R12 is formed from an arbitrary material having light transparency such as a transparent acrylic resin and a glass. A transmission film 56 is laminated on the entire surface of a portion of the base portion 55 which corresponds to the principal surface F5. Then, a reflection film 57 is formed in a predetermined region on the transmission film 56. Accordingly, the second reflection surface Mr2 and the transmission surface Tr2 as illustrated in FIG. 11 can be formed.

An arbitrary thin film having light transparency, such as a metal oxide film, for example, may be formed as the transmission film 56. For example, as illustrated in FIG. 12, the transmission film 56 may be constituted by a plurality of thin films (layers) 58a to 58c. In this case, the thin film 58a constituting the surface of the transmission film 56 is formed as a layer not including fluorine. Accordingly, the reflection film 57 can be stably formed on the surface of the transmission film 56, and high quality is exhibited.

An arbitrary thin film having reflectance, such as a metal film formed from aluminum, silver, and the like, for example, may be formed as the reflection film 57. As a matter of course, the reflection film 57 may be constituted by a plurality of thin films (layers). The method of forming the transmission film 56 on the base portion 55 and the method of forming the reflection film 57 on the transmission film 56 are not limited, and any film forming technique such as vapor deposition can be used.

Moreover, the method of forming the second reflection surface Mr2 and the transmission surface Tr2 is not limited, and any other method may be employed. For example, a transmission film may be formed in a region of the principal surface F, which is the transmission surface Tr2, and a reflection film may be formed in a region of the principal surface F, which is the second reflection surface Mr2.

Figure 13:
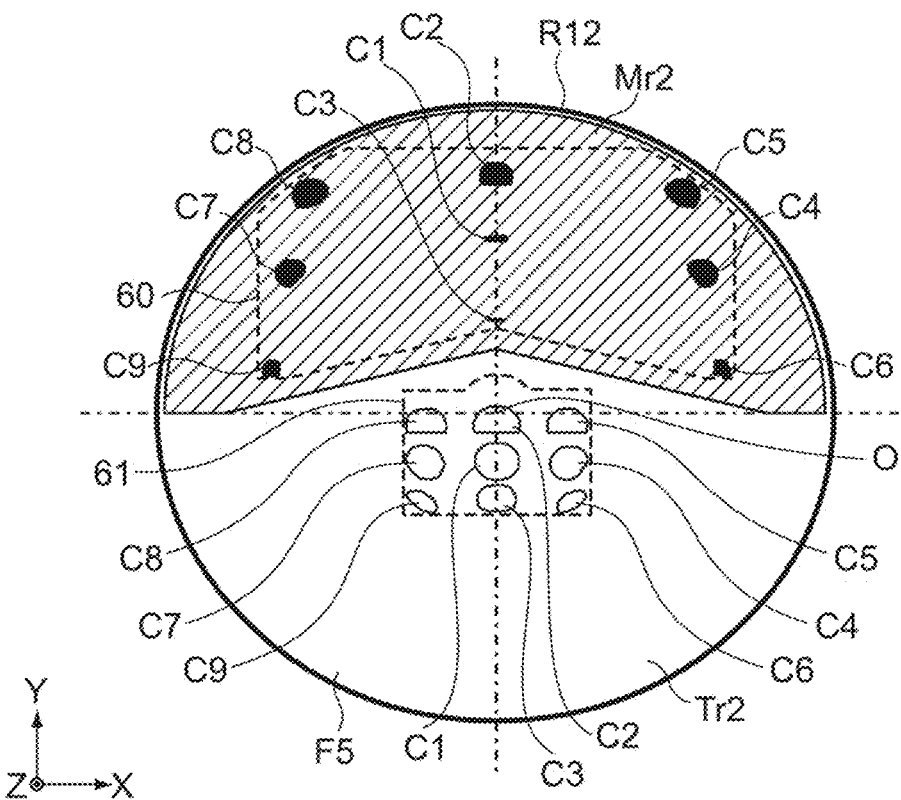
FIG. 13 A schematic view showing a configuration example of a principal surface of the second optical component.

FIG. 13 is a schematic diagram showing a configuration example of the principal surface F5 of the second optical component R12 and is the same figure as FIG. 11. In order not to complicate the reference signs attached to the figure, the descriptions will be given using the two same figures.

As shown in FIG. 13, an effective reflection region 60 is set in the second reflection surface Mr2. Moreover, an effective transmission region 61 is set in the transmission surface Tr2. The effective reflection region 60 and the effective transmission region 61 are each set in a region to be rotationally asymmetric to each other with respect to the optical axis O of the second optical component R12.

The effective transmission region 61 is set in a region including the optical axis O. That is, the effective transmission region 61 is set in a region having a shape rotationally asymmetric to the effective reflection region 60 with respect to the optical axis O and including the optical axis O. In this embodiment, the effective transmission region 61 is configured to include the center of the principal surface F5.

The effective reflection region 60 is set to properly reflect the image light emitted from the liquid-crystal panel P. For example, the effective reflection region 60 is set on the basis of the incident region of the light beam (light flux) when the image light reflected from the first reflection surface Mr1 of the first optical component R11 enters the second reflection surface Mr2. It can also be said that this incident region of the light beam is the region of the light beam corresponding to the angle of view of the liquid-crystal panel P. The effective reflection region 60 is set to include the incident region of the light beam.

For example, it is possible to set the effective reflection region 60 on the basis of the incident region of the pixel light beam C1 to C9 shown in FIG. 13. By setting the effective reflection region 60 on the base of the incident region of the pixel light beam C1 to C9, it is possible to prevent the effective reflection region 60 from becoming larger than necessary. As a result, it is possible to realize miniaturization of the apparatus. As a matter of course, the method of setting the effective reflection region 60 is not limited, and other methods may be employed.

The effective transmission region 61 is set to be capable of allowing the image light emitted from the liquid-crystal panel P to properly pass therethrough. Moreover, the effective transmission region 61 is set to properly include the optical axis O. For example, the effective transmission region 61 is set when the image light emitted from the lighting optical system 20 side enters the transmission surface Tr2 from the rear side on the basis of the incident region of the light beam (light flux). The effective transmission region 61 is set to include the incident region of the light beam and the optical axis O.

For example, it is possible to set the effective transmission region 61 on the basis of the incident region of the pixel light beam C1 to C9 shown in FIG. 13. By setting the effective transmission region 61 on the basis of the incident region of the pixel light beam C1 to C9, it is possible to prevent the effective transmission region 61 from becoming larger than necessary. As a result, it is possible to realize miniaturization of the apparatus. As a matter of course, the method of setting the effective transmission region 61 is not limited, and other methods may be employed.

Figure 14:
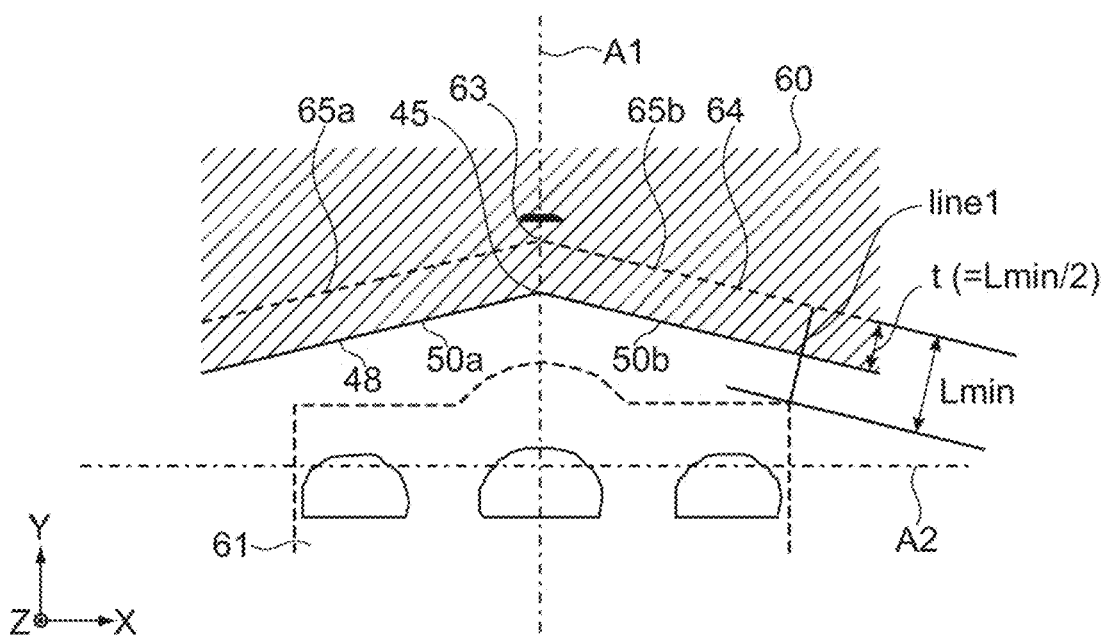
FIG. 14 An enlarged diagram for describing a positional relationship between a boundary between the second reflection surface and the transmission surface, an effective reflection region, and an effective transmission region.

FIG. 14 is an enlarged view for describing a positional relationship between the boundary between the second reflection surface Mr2 and the transmission surface Tr2, the effective reflection region 60, and the effective transmission region 61.

In this embodiment, focusing on the first axis A1, a point 63 separated from the point 45 as the boundary 48 between the second reflection surface Mr2 and the transmission surface Tr2 by a predetermined distance t is set as an edge portion 64 of the effective reflection region 60. Moreover, the edge portion 64 of the effective reflection region 60 is set in a linear shape to be parallel to linear portions 50a and 50b as the boundary 48. Portions parallel to the linear portions 50a and 50b are defined as linear portions 65a and 65b of the edge portion 64 of the effective reflection region 60. The distance between the linear portion 50a and the linear portion 65a and the distance between the linear portion 50b and the linear portion 65b are each equal to the distance t between the point 45 and the point 63.

It can also be said that the distance t is a margin for setting the effective reflection region 60. For example, in a case where the reflection film 57 is formed by a film forming technique such as vapor deposition, it may be difficult to properly secure the effective reflection region 60 if it is too close to the boundary 48 between the second reflection surface Mr2 and the transmission surface Tr2.

Also regarding the effective transmission region 61, it may be difficult to properly secure the effective transmission region 61 if it is too close to the boundary 48 between the second reflection surface Mr2 and the transmission surface Tr2. For example, as shown in FIG. 12, in a case where the reflection film 57 is formed on the transmission film 56 by vapor deposition or the like, the effusion of the reflection film 57 during vapor deposition may enter the effective transmission region 61.

Therefore, the effective reflection region 60 and the effective transmission region 61 are set to secure a certain margin from the boundary 48 between the second reflection surface Mr2 and the transmission surface Tr2. Accordingly, it is possible to properly reflect and transmit the image light. It should be noted that it is also possible to reduce the size of the apparatus by properly setting not to unnecessarily increase the margin.

Here, the inventors of the present technology focused on the portion at which the effective reflection region 60 and the effective transmission region 61 are closest to each other. For example, in this embodiment, an upper right end 66 of the effective transmission region 61 shown in FIG. 14 is a portion closest to the effective reflection region 60 (the same applies to the upper left end).

A perpendicular from the upper right end 66 of the effective transmission region 61 to the linear portion 50b of the effective reflection region 60 is drawn. This perpendicular is a straight line line1 connecting points at which the distance between the effective reflection region 60 and the effective transmission region 61 is the shortest. The length of the straight line line1 is the shortest distance between the effective reflection region 60 and the effective transmission region 61.

Provided that the shortest distance between the effective reflection region 60 and the effective transmission region 61 is Lmin, the effective reflection region 60 and the effective transmission region 61 are each set at a position separated from the boundary 48 between the second reflection surface Mr2 and the transmission surface Tr2 by a distance of Lmin/2 or more. Accordingly, it is possible to properly secure the effective reflection region 60 and the effective transmission region 61.

As shown in FIG. 14, in this embodiment, the boundary 48 is located in the middle on the straight line line1 at the portion at which the effective reflection region 60 and the effective transmission region 61 are closest to each other. That is, the distance between the effective reflection region 60 and the boundary 48 and the distance between the effective transmission region 61 and the boundary 48 are both Lmin/2 (=t). With such a configuration, it is possible to realize miniaturization of the apparatus while realizing proper reflection and transmission of the image light.

Moreover, the effective reflection region 60 and the effective transmission region 61 are set such that the boundary 48 is located in the middle on the straight line line1. Conversely, the manufacturing process of the second optical component R12 is facilitated by setting the boundary 48 in the middle between the effective reflection region 60 and the effective transmission region 61.

Figure 15:
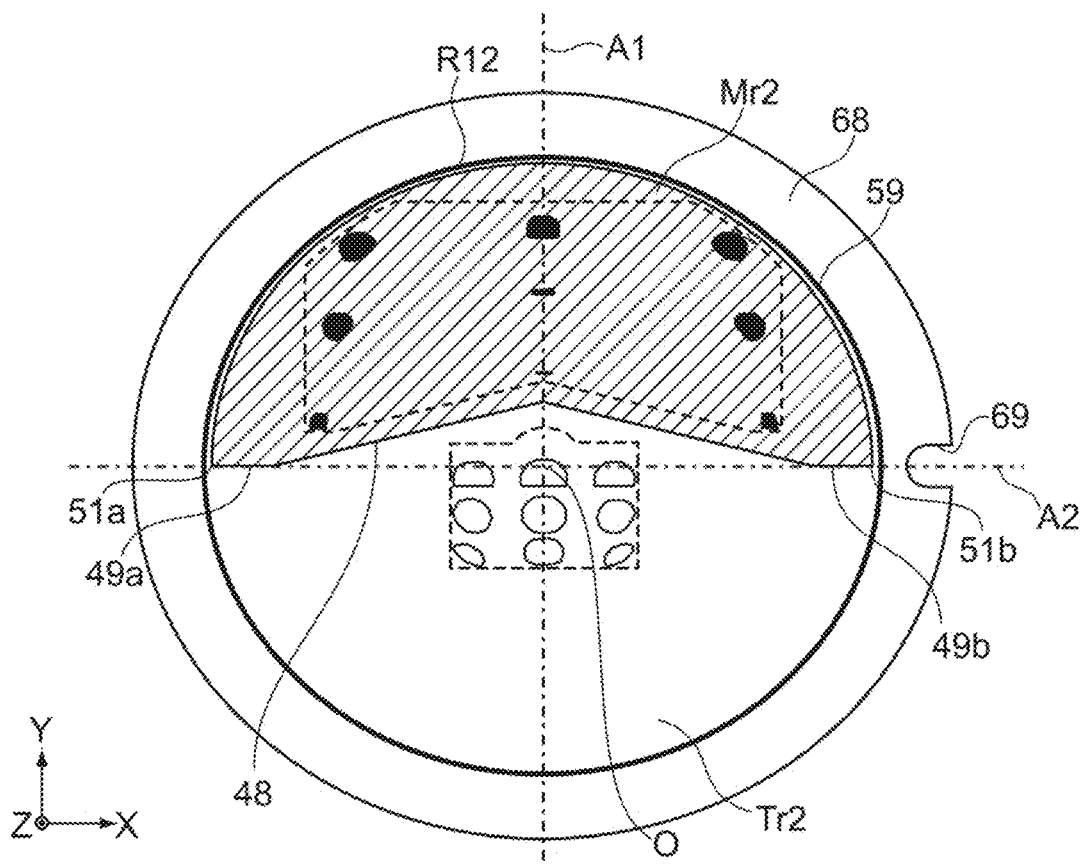
FIG. 15 A schematic view for describing attachment of the second optical component.

FIG. 15 is a schematic diagram for describing attachment of the second optical component R12. The projection optical system 30 shown in FIG. 3 is attached to the lens barrel (not shown). As shown in FIG. 15, the second optical component R12 is held attached to a lens holder 68 which functions as a part of the lens barrel.

The lens holder 68 has a ring shape as viewed in the axial direction of the optical axis O and the second optical component R12 is attached to an inner hollow portion. Therefore, a circumferential edge 59 of the second optical component R12 is held by the lens holder 68. In this embodiment, the lens holder 68 corresponds to a holder.

At a predetermined position of the lens holder 68, a U-shaped cutout 69 is formed extending toward the center from the circumferential edge. The cutout 69 is a mark for attaching the second optical component R12 to the lens holder 68. In this embodiment, the cutout 69 corresponds to a mark configured at a predetermined position.

As shown in FIG. 13, the cutout 69 is formed at a position on the second axis A2 when the second optical component R12 is accurately attached to a target position. Specifically, the cutout 69 is formed such that the cutout 69 extends in the same direction as the second axis A2 when the second optical component R12 is accurately attached to the target position and the second axis A2 is positioned at the center of the U-shape (bottom of the U-shape).

In this embodiment, the boundary 48 between the second reflection surface Mr2 and the transmission surface Tr2 is linear portions 49a and 49b extending along the second axis A2. Moreover, both the end portions Sla and S1b of the boundary 48 are located on the second axis A2.

When the second optical component R12 is attached to the lens holder 68, the focus is put on the linear portions 49a and 49b extending along the second axis A2, both the end portions 51a and Sib of the boundary 48, and the U-shaped cutout 69. For example, the second optical component R12 is attached such that the end portion Sib is positioned at the center of the U-shape of the cutout 69 (bottom of the U-shape). Moreover, the second optical component R12 is attached such that the straight line assumed with the linear portions 49a and 49b extends in the same direction as the U-shape through the center of the U-shape.

Accordingly, it is possible to easily attach the lens holder 68 to the second optical component R12 with high accuracy. For example, the second optical component R12 can be easily attached to fall within an allowable range with respect to the target position. Accordingly, it is possible to improve the workability of the assembly.

For example, a virtual straight line connecting the optical axis O of the second optical component R12 held by the lens holder 68 and the center of the cutout 69 that is the mark is assumed. This straight line is a straight line overlapping the second axis A2 (hereinafter, referred to as target straight line) when the second optical component R12 is accurately attached to the target position. The angle of intersection between the target straight line and the second axis A2 of the second optical component R12 can be easily set to be 5° or less by forming the cutout 69 as the mark.

Thus, it is possible to accurately perform positioning in the rotation direction, it is possible to prevent image missing or the like due to mismatching or the like of the transmission surface and the reflection surface, and it is possible to display a high-quality image.

It should be noted that this 5° or less is an allowable range of positioning which was found by the inventors of the present technology, and it was possible to maintain the projection function of the image display apparatus 100 high within this allowable range. As a matter of course, the allowable range of positioning is not limited to the range of 5° or less.

The configuration of the mark is not limited, and any configuration may be employed. Not limited to the cutout, a member or the like that is the mark may be provided. In addition, any configuration with which the position of the second axis A2 when the second optical component R12 is accurately attached can be known may be employed as the mark.

Figure 16:
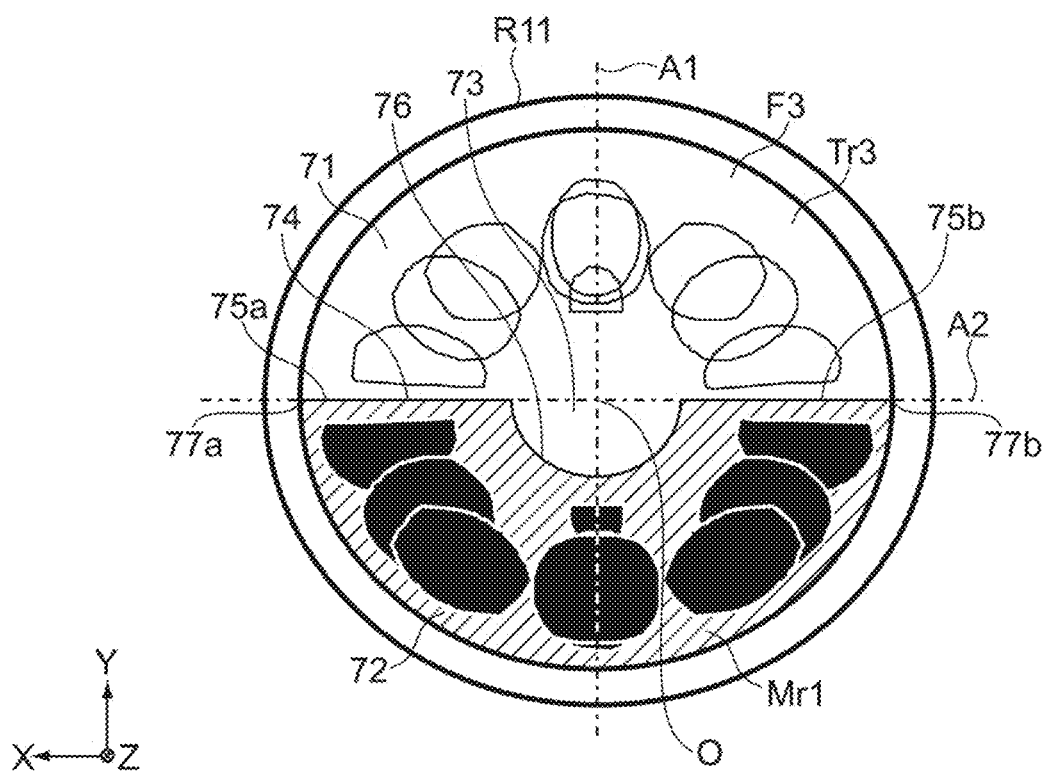
FIG. 16 A schematic view showing a configuration example of a principal surface of the first optical component.

FIG. 16 is a schematic diagram showing a configuration example of the principal surface F3 of the first optical component R11. FIG. 16 is a front view of the principal surface F3 along the optical axis O that is the reference axis.

An axis extending in the up-and-down direction (Y direction) from the position (center position) of the optical axis O as the principal surface F3 is viewed from the front is defined as the first axis A1. Moreover, an axis extending from the position of the optical axis (center position) in the left-and-right direction (X direction) is defined as the second axis A2.

As shown in FIG. 16, the first reflection surface Mr1 that reflects the image light and the transmission surface Tr3 that transmits the image light are configured on the principal surface F3. The first reflection surface Mr1 is one reflection surface of the two or more reflection surfaces of the first reflection optical system R1. The transmission surface Tr3 is a surface that functions as the second lens system L2.

The first reflection surface Mr1 and the transmission surface Tr3 are each formed to be rotationally asymmetric to each other with respect to the optical axis O. Moreover, the transmission surface Tr3 is formed to include the optical axis O. That is, the transmission surface Tr3 is configured in a region having a shape rotationally asymmetric to the first reflection surface Mr1 with respect to the optical axis O and including the optical axis O. In this embodiment, the transmission surface Tr3 is configured to include the center of the principal surface F3.

In this embodiment, an upper half region 71 and a part of a lower half region 72 of two regions obtained by dividing the principal surface F3 in the up-and-down direction by the second axis A2 are configured as the transmission surface Tr3. A part of the lower half region 72 is a semicircular region 73 centered on the center (position of the optical axis O). The semicircular region 73 is connected to the upper half region 71 and the transmission surface Tr3 is configured in these regions.

The first reflection surface Mr1 is configured in a region excluding the semicircular region 73 from the lower half region 72. Accordingly, the first reflection surface Mr1 and the transmission surface Tr3 to be rotationally asymmetric to each other with respect to the optical axis O are configured. Moreover, the transmission surface Tr3 is configured to include the optical axis O.

The semicircular region 73 is symmetric with respect to the first axis A1. Therefore, the first reflection surface Mr1 and the transmission surface Tr3 are configured on the principal surface F3 to be symmetric with respect to the first axis A1 orthogonal to the optical axis O.

As shown in FIG. 16, a boundary 74 between the first reflection surface Mr1 and the transmission surface Tr3 including linear portions 75a and 75b extending along the second axis A2 and an edge portion 76 of the semicircular region 73. Moreover, both end portions 77a and 77b of the boundary 74 between the first reflection surface Mr1 and the transmission surface Tr3 are located on the second axis A2.

Figure 17:
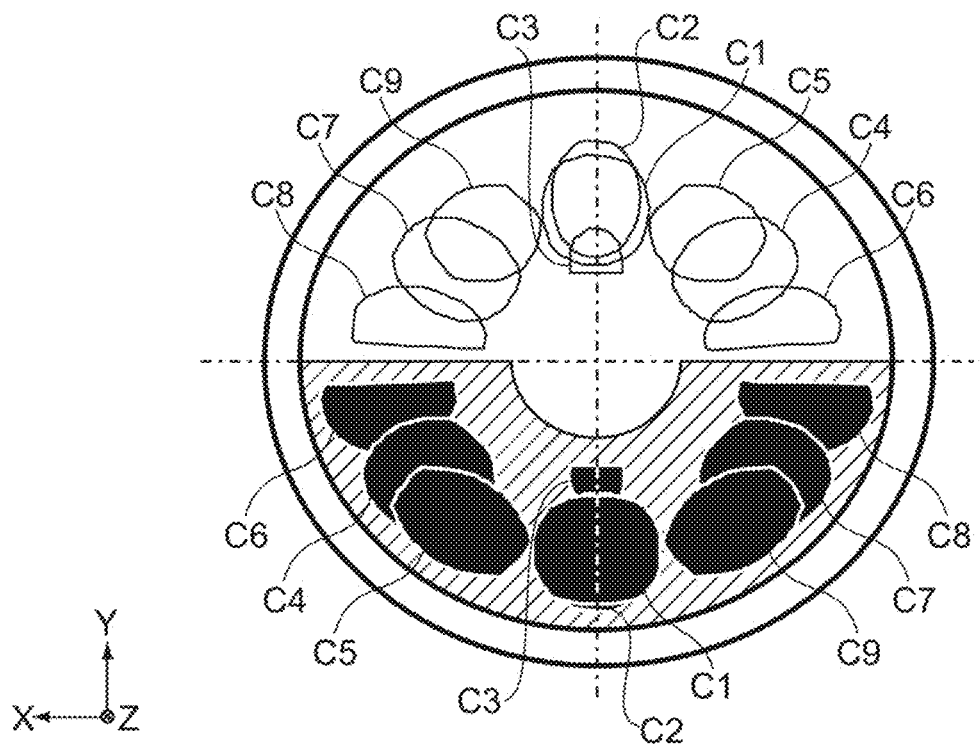
FIG. 17 A schematic view showing a configuration example of a principal surface of the first optical component.

FIG. 17 is a schematic view showing a configuration example of the principal surface F3 of the first optical component R11 and is the same figure as FIG. 16. In FIG. 17, the incident region of the pixel light beam C1 to C9 in the first reflection surface Mr1 and the transmission surface Tr3 will be denoted by the reference signs.

Figure 18:
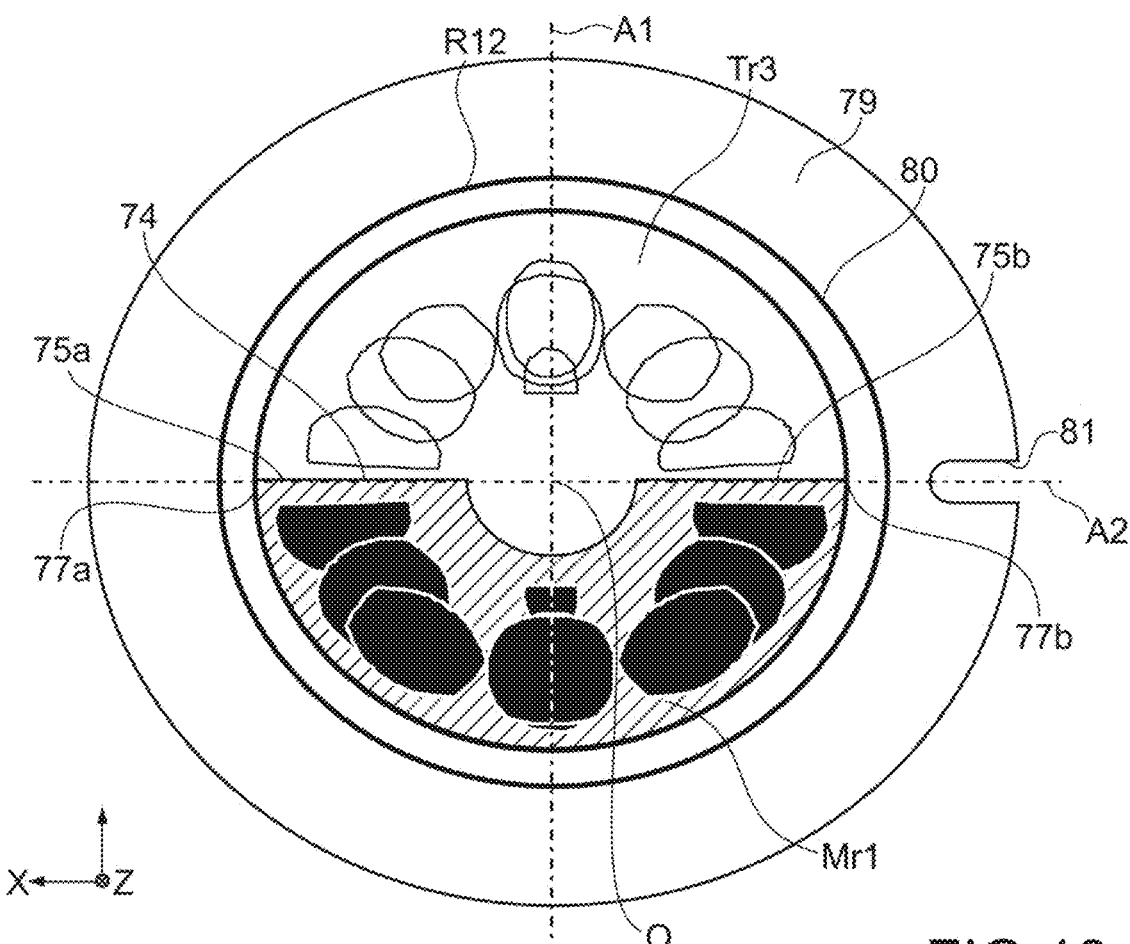
FIG. 18 A schematic view for describing attachment of the first optical component.

FIG. 18 is a schematic diagram for describing attachment of the first optical component R11. As shown in FIG. 18, the first optical component R11 is attached to and held by a lens holder 79 that functions as a part of the lens barrel.

The lens holder 79 has a ring shape as viewed in the axial direction of the optical axis O and the first optical component R11 is attached to an inner hollow portion. Therefore, the circumferential edge 80 of the first optical component R11 is held by the lens holder 79. In this embodiment, the lens holder 79 corresponds to a holder.

A U-shaped cutout 81 extending toward the center from the circumferential edge is formed at a predetermined position of the lens holder 79. The cutout 81 is a mark for attaching the first optical component R11 to the lens holder 79. In this embodiment, the cutout 81 corresponds to a mark configured at a predetermined position.

As shown in FIG. 18, the cutout 81 is formed at a position on the second axis A2 when the first optical component R11 is accurately attached to the target position. Specifically, the cutout 81 is formed such that the cutout 81 extends in the same direction as the second axis A2 when the first optical component R11 is accurately attached to the target position and the second axis A2 is positioned at the center of the U-shape (bottom of the U-shape).

In this embodiment, the boundary 74 between the first reflection surface Mr1 and the transmission surface Tr3 has linear portions 75a and 75b extending along the second axis A2. Moreover, both end portions 77a and 77b of the boundary 74 are located on the second axis A2.

When the first optical component R11 is attached to the lens holder 79, the focus is put on the linear portions 75a and 75b extending along the second axis A2, both the end portions 77a and 77b of the boundary 74, and the U-shaped cutout 81. For example, the first optical component R11 is attached to the end portion 77b to be positioned at the center of the U-shape of the cutout 81 (bottom of the U-shape). Moreover, the first optical component R11 is attached such that the straight line assumed with the linear portions 75a and 75b extends in the same direction as the U-shape through the center of the U-shape.

Accordingly, it is possible to easily attach the first optical component R11 to the lens holder 79 with high accuracy. For example, the first optical component R11 can be easily attached to fall within an allowable range with respect to the target position. Accordingly, it is possible to improve the workability of the assembly.

For example, it is assumed that a virtual axis connecting the optical axis O of the first optical component R11 held by the lens holder 79 and the center of the cutout 81 that is the mark. This straight line is a straight line overlapping the second axis A2 (hereinafter, referred to as target straight line) when the first optical component R11 is accurately attached to the target position. The angle of intersection between the target straight line and the second axis A2 of the first optical component R11 can be easily set to be 5° or less by forming the cutout 81 as the mark.

Thus, it is possible to accurately perform positioning in the rotation direction, it is possible to prevent image missing or the like due to mismatching or the like of the transmission surface and the reflection surface, and it is possible to display a high-quality image.

It should be noted that this 5° or less is an allowable range of positioning which was found by the inventors of the present technology, and it was possible to maintain the projection function of the image display apparatus 100 high within this allowable range. As a matter of course, the allowable range of positioning is not limited to the range of 5° or less.

The configuration of the mark is not limited, and any configuration may be employed. Not limited to the cutout, a member or the like that is the mark may be provided. In addition, any configuration with which the position of the second axis A2 when the first optical component R11 is accurately attached can be known may be employed as the mark.

As described above, in the image display apparatus 100 according to this embodiment, the image light refracted by the first lens system L1 is folded back and reflected by each of the first reflection surface Mr1 and the second reflection surface Mr2, which are two or more reflection surfaces of the first reflection optical system R1. Accordingly, the optical path length of the image light can be sufficiently secured without increasing the size of the projection optical system 30. As a result, it is possible to realize miniaturization of the apparatus.

Moreover, the transmission surface Tr3 is configured in a region having a shape rotationally asymmetric with respect to the first reflection surface Mr1 and including the optical axis O on the principal surface F3 of the first optical component R11 included in the first reflection optical system R1. Moreover, the transmission surface Tr2 is configured in a region having a shape rotationally asymmetric to the second reflection surface Mr2 and including the optical axis O on the principal surface F5 of the second optical component R12.

By configuring the transmission surface Tr2 and the transmission surface Tr3 to include the optical axis O, it is very advantageous for eccentricity measurement of the respective optical components included in the projection optical system 30 with reference to the optical axis O. For example, the eccentricity state of each optical component with respect to the optical axis O is measured by emitting measurement light along the optical axis O and receiving the measurement light passing through each optical component.

It is assumed that the optical axis O is included in the reflection surfaces in the optical components in which the reflection surfaces (first reflection surface Mr1 and second reflection surface Mr2) are configured as in the first optical component R11 and the second optical component R12. In this case, it is likely that the measurement light emitted along the optical axis O from an eccentricity measuring device may be blocked by the reflection surface of the first optical component R11 or the second optical component R12, which may make the eccentricity measurement of each optical component difficult.

In this embodiment, the transmission surface Tr2 and the transmission surface Tr3 are configured to include the optical axis O. Accordingly, the measurement light is prevented from being blocked by the first optical component R11 and the second optical component R12. As a result, it is possible to perform eccentricity measurement of a group of lenses disposed in front of and behind the first optical component R11 and the second optical component R12. For example, it is possible to perform eccentricity measurement on the entire optical system after the optical system is assembled. Accordingly, it is possible to improve the assembly accuracy of the projection optical system 30, and it is possible to project a high-precision image on the screen. That is, performance enhancement of the image display apparatus 100 is realized.

It should be noted that the area and shape of the transmission surface around the optical axis O is not limited as long as it can allow the measurement light to pass therethrough along the optical axis O. For example, the transmission surfaces (transmission surface Tr2 and the transmission surface Tr3) are configured to include a region of a circle having a predetermined radius and having the optical axis O as the center. Although the predetermined radius is not limited, eccentricity measurement was possible by configuring the transmission surface to include a circle having a radius of 1 mm or more, for example. As a matter of course, it may be possible to perform eccentricity measurement by using a circular region having a smaller radius as the transmission surface.

As illustrated in FIG. 3, the first optical component R11 has the aspherical surface F3 as a surface opposite to the principal surface F3. Moreover, the second optical component R12 has the plane F6 as a surface opposite to the principal surface F5. Also in the aspherical surface F3 and the plane F6, the region including the optical axis O is configured as the transmission surface. Accordingly, the measurement light is prevented from being blocked, and it is possible to perform eccentricity measurement with high accuracy.

In a case where the second optical component R12 and the optical component L13 are generally considered as the optical component according to the present technology, the spherical surface of the optical component L13 (lens surface S14 in the lens data of FIG. 6) is included in the surface opposite to the principal surface F5. A region including the optical axis O of the spherical surface of the optical component L13 is configured as the transmission surface.

Another method for eccentricity measurement is a method of receiving the measurement light reflected by the optical component. That is, it is a method of measuring the eccentricity state by emitting the measurement light along the optical axis O and receiving light reflected by the surface of the optical component. In this method, it is possible to use the reflected light having a small amount of light reflected on the surface of the optical component. That is, even if the measurement object is the transmission surface, it is possible to measure the eccentricity state on the basis of the measurement light reflected on the transmission surface.

Even if the eccentricity measurement based on the reflected light is performed, it is possible to perform eccentricity measurement with high accuracy by configuring the transmission surface Tr2 and the transmission surface Tr3 to include the optical axis O. That is, it is possible to perform eccentricity measurement of the group of lenses disposed in front of and behind the first optical component R11 and the second optical component R12. As a result, it is possible to improve the assembly accuracy of the projection optical system 30. As a matter of course, it is also possible perform eccentricity measurement of the first optical component R11 and the second optical component R12 themselves.

It should be noted that in this embodiment, the reflection surface and the transmission surface in the region having the shape rotationally asymmetric to the reflection surface and including the optical axis O are configured both in the principal surface F3 of the first optical component R11 and the principal surface F5 of the second optical component R12 are configured (hereinafter, referred to as configuration according to the present technology). That is, the configuration according to the present technology is realized with respect to all the principal surfaces of the two or more reflection surfaces of the first reflection optical system R1 is realized.

The present technology is not limited thereto, and it is possible to improve the accuracy of the eccentricity measurement even if the configuration according to the present technology is realized only on one principal surface on which one of the two or more reflection surfaces of the first reflection optical system R1 is configured. That is, it is possible to realize miniaturization and performance enhancement of the image display apparatus 100 by employing the configuration according to the present technology on the principal surface on which at least one reflection surface of the two or more reflection surfaces of the first reflection optical system R1 is configured.

For example, there may be an optical component that does not need to allow the measurement light to pass therethrough in a manner that depends on the number, arrangement, and the like of the group of lenses on which the eccentricity measurement is to be performed. For example, in view of such a point, it may be determined whether or not the optical component is an optical component for which the configuration according to the present technology is to be employed, for example.

Second Embodiment

A projection-type image display apparatus according to a second embodiment of the present technology will be described. Hereinafter, descriptions of those similar to the configurations and actions of the image display apparatus 100 described in the above-mentioned embodiment will be omitted or simplified.

Figure 19:
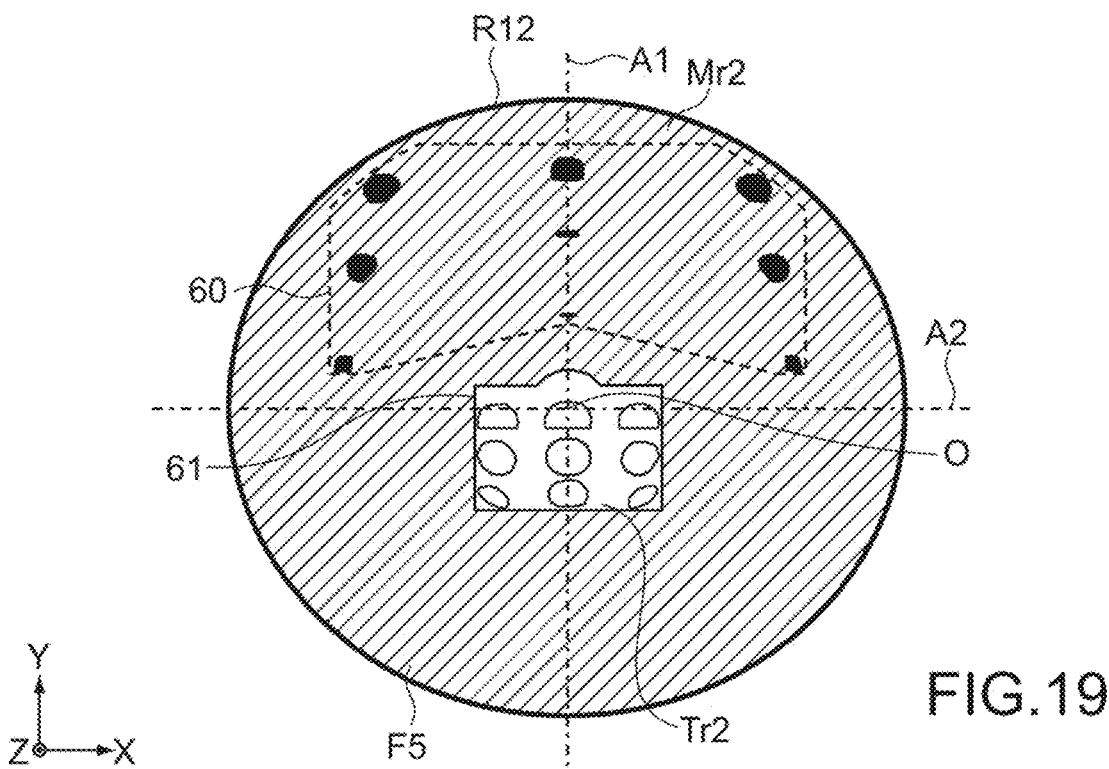
FIG. 19 A schematic view showing a configuration example of a principal surface of a second optical component according to a second embodiment.

FIG. 19 is a schematic diagram showing a configuration example of the principal surface F5 of the second optical component R12 according to this embodiment. In this embodiment, a portion of an effective transmission region 61 is configured as the transmission surface Tr2. Then, a portion other than the effective transmission region 61 is configured as the second reflection surface Mr2. The effective reflection region 60 is set in the second reflection surface Mr2.

Also in the configuration of this embodiment, the second reflection surface Mr2 and the transmission surface Tr2 are each formed to be rotationally asymmetric to each other with respect to the optical axis O. Moreover, the transmission surface Tr2 is formed to include the optical axis O. Accordingly, the above-mentioned effects are exhibited. It should be noted that it is possible to sufficiently suppress the influence of the effusion of the film during vapor deposition or the like by setting the effective transmission region 61 as appropriate.

Third Embodiment

Figure 20:
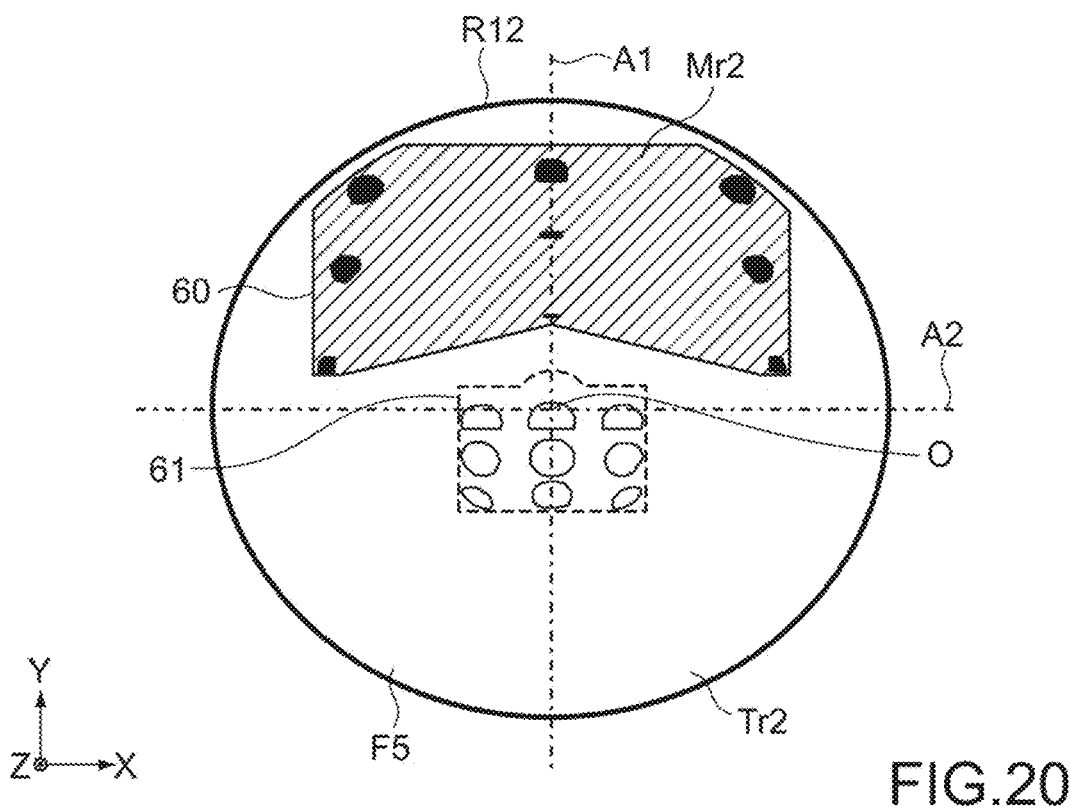
FIG. 20 A schematic view showing a configuration example of a principal surface of a second optical component according to a third embodiment.

FIG. 20 is a schematic diagram showing a configuration example of the principal surface F5 of the second optical component R12 according to a third embodiment of the present technology. In this embodiment, a portion of the effective reflection region 60 is configured as the second reflection surface Mr2. Then, a portion other than the effective reflection region 60 is configured as the transmission surface Tr2. The effective transmission region 61 is set on the transmission surface Tr2.

Also in the configuration of this embodiment, the second reflection surface Mr2 and the transmission surface Tr2 are each formed to be rotationally asymmetric to each other with respect to the optical axis O. Moreover, the transmission surface Tr2 is formed to include the optical axis O. Accordingly, the above-mentioned effects are exhibited. It should be noted that it is possible to sufficiently suppress the influence during film formation or the like by setting the effective reflection region 60 as appropriate.

Fourth Embodiment

Figure 21:
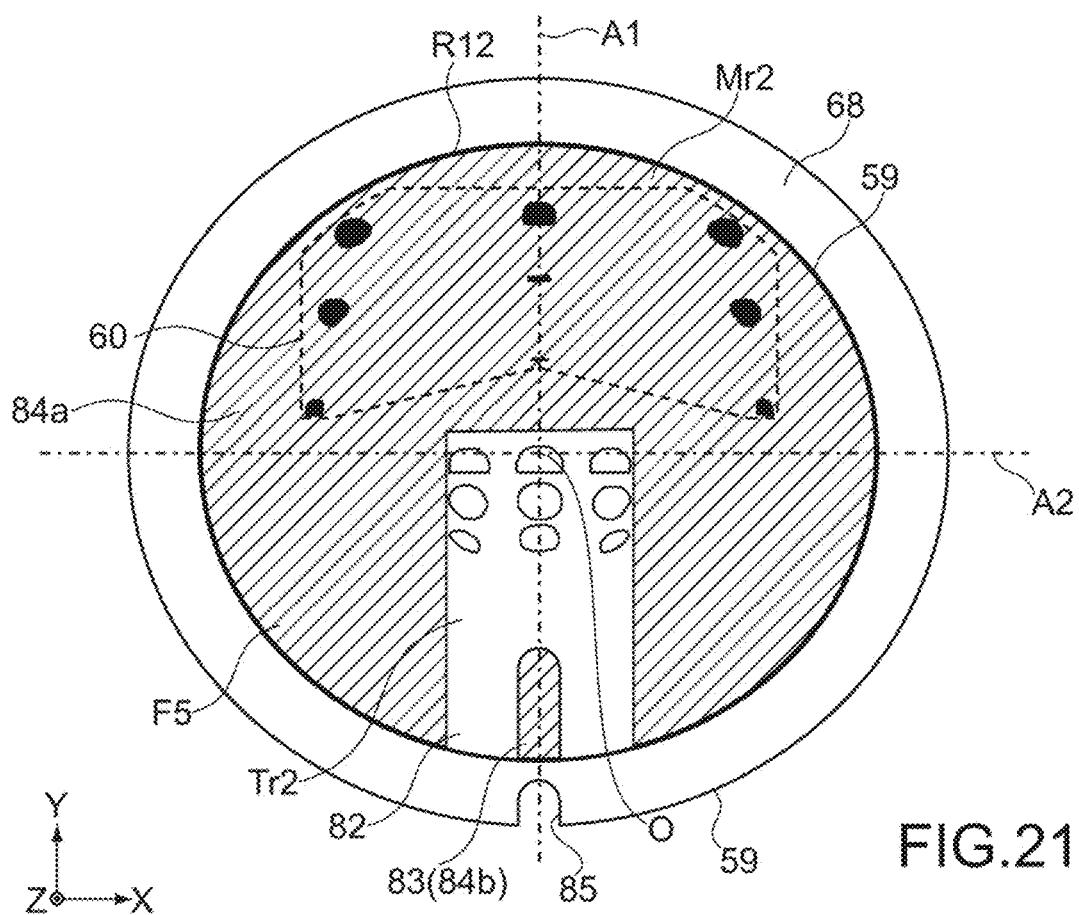
FIG. 21 A schematic view showing a configuration example of a principal surface of a second optical component according to a fourth embodiment.

FIG. 21 is a schematic diagram showing a configuration example of the principal surface F5 of the second optical component R12 according to a fourth embodiment of the present technology. Moreover, FIG. 21 also shows the lens holder 68 that holds the second optical component R12.

In this embodiment, an extended region 82 obtained by extending a region of the effective transmission region 61 illustrated in FIG. 13 and the like, from which a semicircular protruding portion formed on the upper side of the figure is omitted, along the first axis A1 is defined. The extended region 82 is a region extended to the circumferential edge 59 of the second optical component R12 along the first axis A1. A region of this extended region 82, which excludes a partial region 83, is configured as the transmission surface Tr2.

A reflection surface 84a is configured in a region of the principal surface F5, which is different from the extended region 82. Moreover, a reflection surface 84b is configured in the partial region 83 in the extended region 82. The reflection surfaces 84a and 84b constitute the second reflection surface Mr2. The effective reflection region 60 is set in the reflection surface 84a constituting the second reflection surface Mr2.

Also in the configuration of this embodiment, the second reflection surface Mr2 and the transmission surface Tr2 are each formed to be rotationally asymmetric to each other with respect to the optical axis O. Moreover, the transmission surface Tr2 is formed to include the optical axis O. Accordingly, the above-mentioned effects are exhibited.

In this embodiment, the reflection surface 84b is configured as the mark for attaching the second optical component R12 to the lens holder 68. As shown in FIG. 21, the reflection surface 84b is formed in a U-shaped region extending toward the center from the circumferential edge 59. Moreover, the reflection surface 84b is formed such that the reflection surface 84b extends in the same direction as the first axis A1 and the first axis A1 is positioned in the center of the U-shape (bottom of the U-shape). For example, the first axis A1 can be easily assumed by visually recognizing the reflection surface 84b formed in the transmission surface Tr2.

In this embodiment, the center of the reflection surface 84b functions as the mark positioned on the first axis A1. It should be noted that it is sufficient to be able to know the U-shaped outer shape, and thus it is unnecessary to configure it as the reflection surface. On the other hand, by configuring it as the reflection surface, it is possible to form the reflection surface 84b at the same time as the reflection surface 84a having the function of reflecting the image light, and it is possible to simplify the process. In addition, any configuration may be employed as the configuration of the mark.

A U-shaped cutout 85 extending toward the center from the circumferential edge is formed at a predetermined position of the lens holder 68. The cutout 85 is a mark for attaching the second optical component R12 to the lens holder 68. In this embodiment, the cutout 85 corresponds to a mark configured at a predetermined position.

As shown in FIG. 21, the cutout 85 is formed at a position on the first axis A1 when the second optical component R12 is accurately attached to the target position. Specifically, the cutout 85 is formed such that the cutout 85 extends in the same direction as the first axis A1 when the second optical component R12 is accurately attached to the target position and the first axis A1 is positioned at the center of the U-shape (bottom of the U-shape).

When the second optical component R12 is attached to the lens holder 68, the U-shaped reflection surface 84b and the U-shaped cutout 85 are noticed. For example, the second optical component R12 is attached such that the positions of the centers of the respective U-shapes of the reflection surface 84b and the cutout 85 (bottom of the U-shape) are coincident with each other. Moreover, the second optical component R12 is attached such that the extending directions of the respective U-shapes are coincident with each other.

For example, the width of the cutout 85 (size in the X direction) and the width of the reflection surface 84b are configured to be equal to each other. Accordingly, it is possible to position the reflection surface 84b and the cutout 85 with high accuracy.

As in this embodiment, the reflection surface 84b and the cutout 85 are formed as the marks. Accordingly, the second optical component R12 can be easily attached to the lens holder 68 with high accuracy. For example, the second optical component R12 can be easily attached to fall within an allowable range with respect to the target position. Accordingly, it is possible to improve the workability of the assembly.

For example, a virtual straight line connecting the optical axis O of the second optical component R12 held by the lens holder 68 and the center of the cutout 85 that is the mark is assumed. This straight line is a straight line overlapping the first axis A1 (hereinafter, referred to as first target straight line) when the second optical component R12 is accurately attached to the target position.

Moreover, a virtual straight line connecting the optical axis O of the second optical component R12 and the center of the reflection surface 84b that is the mark is assumed. This straight line is a straight line overlapping the first axis A1

(hereinafter, referred to as second target straight line). The angle of intersection between the first target straight line and the second target straight line (first axis A1) can be easily set to be 5° or less by forming the reflection surface 84b and the cutout 85 as the marks.

Thus, it is possible to accurately perform positioning in the rotation direction, and thus it is possible to prevent image missing or the like due to mismatching or the like of the transmission surface and the reflection surface, and it is possible to display a high-quality image.

It should be noted that this 5° or less is an allowable range of positioning which was found by the inventors of the present technology, and it was possible to maintain the projection function of the image display apparatus 100 high within this allowable range. As a matter of course, the allowable range of positioning is not limited to the range of 5° or less.

The configuration of the mark is not limited, and any configuration may be employed. Not limited to the cutout, a member or the like that is the mark may be provided. In addition, any configuration with which the position of the first axis A1 when the second optical component R12 is accurately attached can be known may be employed as the mark.

Fifth Embodiment

Figure 22:
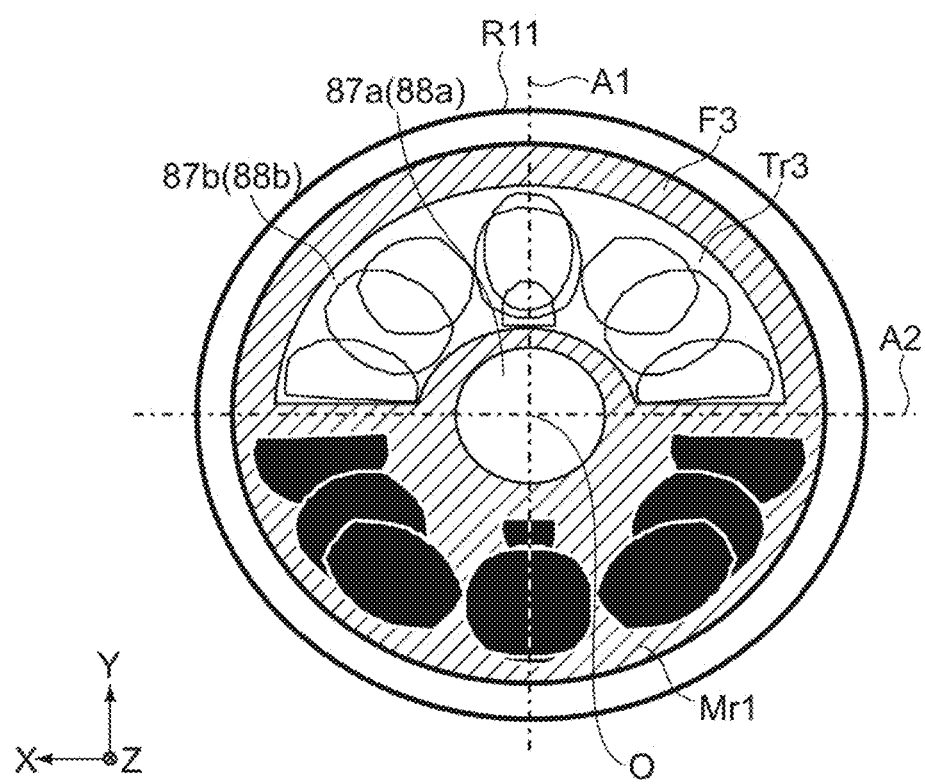
FIG. 22 A schematic view showing a configuration example of a principal surface of a first optical component according to a fifth embodiment.

FIG. 22 is a schematic diagram showing a configuration example of the principal surface F3 of the first optical component R11 according to a fifth embodiment of the present technology. In this embodiment, a transmission surface 88a is configured in a first region 87a including the optical axis O of the principal surface F3 and a transmission surface 88b is configured in a second region 87b different from the first region 87a. The transmission surfaces 88a and 88b constitute the transmission surface Tr3.

That is, in this embodiment, the transmission surface Tr3 is configured, divided into the first region 87a including the optical axis O of the principal surface F3 and the second region 87b different from the first region 87a. The first reflection surface Mr1 is configured in a region other than the first region 87a and the second region 87b of the principal surface F3.

Also in the configuration of this embodiment, the first reflection surface Mr1 and the transmission surface Tr3 are each formed to be rotationally asymmetric to each other with respect to the optical axis O. Moreover, the transmission surface Tr3 is formed to include the optical axis O. Accordingly, the above-mentioned effects are exhibited.

OTHER EMBODIMENTS

The present technology is not limited to the above-mentioned embodiments and various other embodiments can be made.

In the first to fifth embodiments, the contents described as the configuration example of the principal surface F3 of the first optical component R11 can also be applied to the principal surface F5 of the second optical component R12. Moreover, the contents described as the configuration example of the principal surface F5 of the second optical component R12 can also be applied to the principal surface F3 of the first optical component R11.

It is possible to realize miniaturization and performance enhancement of the apparatus by applying the present technology also in a case where at least one or any two of the first reflection surface Mr1, the second reflection surface Mr2, or the concave reflection surface Mr3 are constituted by free-form surfaces or where a configuration in which at least one or any two of the first reflection surface Mr1, the second reflection surface Mr2, or the concave reflection surface Mr3 are made eccentric and inclined is employed.

Specific numbers of the two or more reflection surfaces included in the first reflection optical system R1 are not limited. Even in a case where three or more reflection surfaces are configured, the present technology can be applied.

The number of times the main light beam C1 of the image light intersects with the optical axis O is not limited to four. For example, it is possible to realize miniaturization and performance enhancement of the apparatus even if the main light beam C1 of the image light intersects with the optical axis O four or more times.

The number of intermediate images is not limited, and two intermediate images may be generated or three or more intermediate images may be generated. In any case, the optical path length is sufficiently ensured by the first and second reflection surfaces Mr1 and Mr2, and thus it is possible to realize miniaturization and performance enhancement of the apparatus.

The present technology can also be applied to any image display apparatus other than the projector.

The configurations of the image display apparatus, the projection optical system, the screen, and the like described with reference to the drawings are merely an embodiment, and can be arbitrarily modified without departing from the gist of the present technology. In other words, for example, any other configurations, algorithms, and the like for implementing the present technology may be employed.

In the present disclosure, "coincident," "equal," "the same," "uniform," "center," "middle," "symmetric," "vertical," "orthogonal," "parallel," "U-shaped," "circular," "linear," and the like are concepts including "substantially coincident," "substantially equal," "substantially the same," "substantially uniform," "substantially middle," "substantially center," "substantially symmetric," "substantially vertical," "substantially orthogonal," "substantially parallel," "substantially U-shaped," "substantially circular," "substantially linear," and the like.

For example, the states included in a predetermined range (e.g., range of ±10%) with reference to "completely coincident," "completely the same," "completely equal," "completely uniform," "completely center," "completely symmetric," "completely perpendicular," "completely parallel," "completely U-shaped," "completely circular," "completely linear," and the like are also included. Therefore, the concepts such as "substantially coincident" and "substantially equal" are also the concepts included in "coincident," "equal," and the like.

At least two of the feature parts according to the present technology described above can also be combined. In other words, various feature parts described in each embodiment may be arbitrarily combined across the embodiments. Moreover, the various effects described above are merely illustrative, not limitative, and other effects may be provided.

It should be noted that the present technology can also take the following configurations.

(1) An image display apparatus, including:
  a light source;
  an image generation unit that modulates light emitted from the light source and generates the image light; and
  a projection optical system including
    a first lens system that has a positive refractive power as a whole and refracts the generated image light, a first reflection optical system having two or more reflection surfaces that fold back and reflect the image light refracted by the first lens system, a second lens system that has a positive refractive power as a whole and refracts the image light reflected by the first reflection optical system, and a second reflection optical system having a concave reflection surface that reflects the image light refracted by the second lens system toward a projection object, in which the first reflection optical system includes an optical component having a principal surface on which one reflection surface of the two or more reflection surfaces is configured, and the principal surface of the optical component includes a transmission surface that allows the image light to pass therethrough, the transmission surface being configured in a region having a shape rotationally asymmetric to the reflection surface with respect to an optical axis of the optical component and including the optical axis.

(2) (1)

The image display apparatus according to claim 1, in which the reflection surface of the optical component includes an effective reflection region, and the transmission surface of the optical component includes an effective transmission region that is set in a region having a shape rotationally asymmetric to the effective reflection region with respect to the optical axis of the optical component.

(3) The image display apparatus according to (2), in which the effective transmission region includes the optical axis.

(4) The image display apparatus according to (2) or (3), in which provided that a shortest distance between the effective reflection region and the effective transmission region is Lmin, the effective reflection region and the effective transmission region are each set at a position separated from a boundary between the reflection surface of the optical component and the transmission surface of the optical component by a distance of Lmin/2 or more.

(5) The image display apparatus according to (4), in which the boundary between the reflection surface of the optical component and the transmission surface of the optical component is positioned in a middle on a straight line connecting points at which a distance between the effective reflection region and the effective transmission region is shortest.

(6) The image display apparatus according to any one of (1) to (5), in which the reflection surface of the optical component and the transmission surface of the optical component are configured on the principal surface to be symmetric with respect to a predetermined first axis orthogonal to the optical axis of the optical component.

(7) The image display apparatus according to (6), in which the projection optical system is configured such that an optical axis of each of all optical components included in the projection optical system is coincident with a predetermined reference axis, and the image light is emitted along the reference axis from a position offset from the reference axis in an axis direction of the first axis.

(8) The image display apparatus according to (6) or (7), further including a holder that includes a mark configured at a predetermined position and holds a circumferential edge of the optical component, in which an angle of intersection between a straight line connecting the optical axis of the optical component held by the holder and a center of the mark of the holder and a second axis orthogonal to each of the optical axis of the optical component and the first axis is 5° or less as viewed in an optical axis direction of the optical component.

(9) The image display apparatus according to (8), in which end portions of the boundary between the reflection surface of the optical component and the transmission surface of the optical component are positioned on the second axis.

(10) The image display apparatus according to (6) or (7), further including a holder that includes a mark configured at a predetermined position and holds a circumferential edge of the optical component, in which the optical component includes a mark centered on the first axis, and an angle of intersection between a straight line connecting the optical axis of the optical component held by the holder and a center of the mark of the holder and a straight line connecting the optical axis of the optical component and the center of the mark of the optical component is 5° or less as viewed in an optical axis direction of the optical component.

(11) The image display apparatus according to any one of (1) to (10), in which the transmission surface of the optical component is configured, divided into a first region of the principal surface, which includes the optical axis, and a second region different from the first region.

(12) The image display apparatus according to any one of (1) to (11), in which the optical component includes a base portion having light transparency, a transmission film that is laminated on the base portion, and a reflection film that is laminated on the transmission film, and the transmission film has a surface which is constituted by a layer not including fluorine.

(13) The image display apparatus according to any one of (1) to (12), in which the optical component has a surface opposite to the principal surface, and the opposite surface includes a region including the optical axis of the optical component and configured as the transmission surface.

(14) The image display apparatus according to any one of (1) to (13), in which the projection optical system is configured such that the optical axis of each of all optical components included in the projection optical system is coincident with a predetermined reference axis.

(15) The image display apparatus according to (7), in which the predetermined reference axis is an axis obtained by extending an optical axis of a lens disposed at a position closest to the image generation unit included in the first lens system.

(16) The image display apparatus according to any one of (1) to (15), in which the optical axis of the optical component is positioned at a center of the principal surface of the optical component.

(17) The image display apparatus according to any one of (1) to (16), in which
the transmission surface of the optical component functions as the first lens system.
(18) The image display apparatus according to any one of (1) to (16), in which
the transmission surface of the optical component functions as the second lens system.
(19) The image display apparatus according to any one of (1) to (18), in which
the optical component has a circular outer shape as viewed in an optical axis direction of the optical component.
(20) A projection optical system that projects image light generated by modulating light emitted from a light source, including:
a first lens system that has a positive refractive power as a whole and refracts the generated image light;
a first reflection optical system having two or more reflection surfaces that fold back and reflect the image light refracted by the first lens system;
a second lens system that has a positive refractive power as a whole and refracts the image light reflected by the first reflection optical system; and
a second reflection optical system having a concave reflection surface that reflects the image light refracted by the second lens system toward a projection object, in which
the first reflection optical system includes an optical component having a principal surface on which one reflection surface of the two or more reflection surfaces is configured, and
the principal surface of the optical component includes a transmission surface that allows the image light to pass therethrough, the transmission surface being configured in a region having a shape rotationally asymmetric to the reflection surface with respect to an optical axis of the optical component and including the optical axis.

REFERENCE SIGNS LIST

A1 first axis
A2 the second axis
F3 principal surface of first optical component
F5 principal surface of second optical component
L1 first lens system
L2 second lens system
Mr1 first reflection surface
Mr2 second reflection surface
Mr3 concave reflection surface
O optical axis (reference axis)
R1 first reflection optical system
R11 first optical component
R12 second optical component
R2 second reflection optical system
Tr2 transmission surface of principal surface of second optical component
Tr3 transmission surface of principal surface of first optical component
1 liquid-crystal projector
2 image
10 light source
20 illumination optical system
30 projection optical system
48, 74 boundary
51a, 51b, 77a, 77b end portion of boundary
55 base portion
56 transmission film
57 reflection film
60 effective reflection region
61 effective transmission region
69, 81, 85 cutout
84b reflection surface that is mark
87a first region
87b second region
100 image display apparatus

The invention claimed is:
1. An image display apparatus, comprising:
a light source;
an image generation unit that modulates light emitted from the light source and generates the image light; and
a projection optical system including
a first lens system that has a positive refractive power as a whole and refracts the generated image light,
a first reflection optical system having two or more reflection surfaces that fold back and reflect the image light refracted by the first lens system,
a second lens system that has a positive refractive power as a whole and refracts the image light reflected by the first reflection optical system, and
a second reflection optical system having a concave reflection surface that reflects the image light refracted by the second lens system toward a projection object, wherein
the first reflection optical system includes an optical component having a principal surface on which one reflection surface of the two or more reflection surfaces is configured, and
the principal surface of the optical component includes a transmission surface that allows the image light to pass therethrough, the transmission surface being configured in a region having a shape rotationally asymmetric to the reflection surface with respect to an optical axis of the optical component and including the optical axis.
2. The image display apparatus according to claim 1, wherein
the reflection surface of the optical component includes an effective reflection region, and
the transmission surface of the optical component includes an effective transmission region that is set in a region having a shape rotationally asymmetric to the effective reflection region with respect to the optical axis of the optical component.
3. The image display apparatus according to claim 2, wherein
the effective transmission region includes the optical axis.
4. The image display apparatus according to claim 2, wherein
provided that a shortest distance between the effective reflection region and the effective transmission region is Lmin, the effective reflection region and the effective transmission region are each set at a position separated from a boundary between the reflection surface of the optical component and the transmission surface of the optical component by a distance of Lmin/2 or more.
5. The image display apparatus according to claim 4, wherein
the boundary between the reflection surface of the optical component and the transmission surface of the optical component is positioned in a middle on a straight line connecting points at which a distance between the effective reflection region and the effective transmission region is shortest.

6. The image display apparatus according to claim 1, wherein
the reflection surface of the optical component and the transmission surface of the optical component are configured on the principal surface to be symmetric with respect to a predetermined first axis orthogonal to the optical axis of the optical component.

7. The image display apparatus according to claim 6, wherein
the projection optical system is configured such that an optical axis of each of all optical components included in the projection optical system is coincident with a predetermined reference axis, and
the image light is emitted along the reference axis from a position offset from the reference axis in an axis direction of the first axis.

8. The image display apparatus according to claim 6, further comprising
a holder that includes a mark configured at a predetermined position and holds a circumferential edge of the optical component, wherein
an angle of intersection between a straight line connecting the optical axis of the optical component held by the holder and a center of the mark of the holder and a second axis orthogonal to each of the optical axis of the optical component and the first axis is 5° or less as viewed in an optical axis direction of the optical component.

9. The image display apparatus according to claim 8, wherein
end portions of the boundary between the reflection surface of the optical component and the transmission surface of the optical component are positioned on the second axis.

10. The image display apparatus according to claim 6, further comprising
a holder that includes a mark configured at a predetermined position and holds a circumferential edge of the optical component, wherein
the optical component includes a mark centered on the first axis, and
an angle of intersection between a straight line connecting the optical axis of the optical component held by the holder and a center of the mark of the holder and a straight line connecting the optical axis of the optical component and the center of the mark of the optical component is 5° or less as viewed in an optical axis direction of the optical component.

11. The image display apparatus according to claim 1, wherein
the transmission surface of the optical component is configured, divided into a first region of the principal surface, which includes the optical axis, and a second region different from the first region.

12. The image display apparatus according to claim 1, wherein
the optical component includes
a base portion having light transparency,
a transmission film that is laminated on the base portion, and
a reflection film that is laminated on the transmission film, and
the transmission film has a surface which is constituted by a layer not including fluorine.

13. The image display apparatus according to claim 1, wherein
the optical component has a surface opposite to the principal surface, and
the opposite surface includes a region including the optical axis of the optical component and configured as the transmission surface.

14. The image display apparatus according to claim 1, wherein
the projection optical system is configured such that the optical axis of each of all optical components included in the projection optical system is coincident with a predetermined reference axis.

15. The image display apparatus according to claim 7, wherein
the predetermined reference axis is an axis obtained by extending an optical axis of a lens disposed at a position closest to the image generation unit included in the first lens system.

16. The image display apparatus according to claim 1, wherein
the optical axis of the optical component is positioned at a center of the principal surface of the optical component.

17. The image display apparatus according to claim 1, wherein
the transmission surface of the optical component functions as the first lens system.

18. The image display apparatus according to claim 1, wherein
the transmission surface of the optical component functions as the second lens system.

19. The image display apparatus according to claim 1, wherein
the optical component has a circular outer shape as viewed in an optical axis direction of the optical component.

20. A projection optical system that projects image light generated by modulating light emitted from a light source, comprising:
a first lens system that has a positive refractive power as a whole and refracts the generated image light;
a first reflection optical system having two or more reflection surfaces that fold back and reflect the image light refracted by the first lens system;
a second lens system that has a positive refractive power as a whole and refracts the image light reflected by the first reflection optical system; and
a second reflection optical system having a concave reflection surface that reflects the image light refracted by the second lens system toward a projection object, wherein
the first reflection optical system includes an optical component having a principal surface on which one reflection surface of the two or more reflection surfaces is configured, and
the principal surface of the optical component includes a transmission surface that allows the image light to pass therethrough, the transmission surface being configured in a region having a shape rotationally asymmetric to the reflection surface with respect to an optical axis of the optical component and including the optical axis.

* * * * *